(12) United States Patent
Huang et al.

(10) Patent No.: US 11,943,794 B2
(45) Date of Patent: Mar. 26, 2024

(54) DIFFERENTIATED CHANNEL STATE INFORMATION FEEDBACK BASED ON DECODING STATISTICS

(71) Applicant: QUALCOMM Incorporated, San Diego, CA (US)

(72) Inventors: Yi Huang, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 17/450,875

(22) Filed: Oct. 14, 2021

(65) Prior Publication Data

US 2022/0124737 A1   Apr. 21, 2022

Related U.S. Application Data

(60) Provisional application No. 63/093,098, filed on Oct. 16, 2020.

(51) Int. Cl.
*H04W 72/04* (2023.01)
*H04B 7/06* (2006.01)
(Continued)

(52) U.S. Cl.
CPC .......... *H04W 72/54* (2023.01); *H04B 7/0626* (2013.01); *H04B 7/0639* (2013.01);
(Continued)

(58) Field of Classification Search
CPC ............. H04W 72/54; H04W 72/1268; H04W 72/1273; H04W 72/23; H04B 7/0626;
(Continued)

(56) References Cited

U.S. PATENT DOCUMENTS

| 2012/0147773 A1* | 6/2012 | Kim ...................... H04L 5/0055 370/252 |
| 2013/0114561 A1 | 5/2013 | Simonsson et al. |

(Continued)

FOREIGN PATENT DOCUMENTS

WO   WO-2021160375 A1   8/2021

OTHER PUBLICATIONS

NPL R1-1812222, Huawei, UCI enhancements for URLLC, 3GPP TSG RAN WG1 Meeting #95, Spokane, USA, Nov. 12-16, 2018 (Year: 2018).*

(Continued)

*Primary Examiner* — Mahbubul Bar Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may determine that a communication on a physical downlink shared channel (PDSCH) was successfully decoded or was not successfully decoded. The UE may transmit channel state information (CSI) feedback that includes PDSCH decoding information via a first operation based at least in part on the determination that the communication was successfully decoded, or via a second operation (Continued)

700 ⟶ based at least in part on the determination that the communication was not successfully decoded. Numerous other aspects are provided.

30 Claims, 15 Drawing Sheets

(51) Int. Cl.
*H04L 1/1812* (2023.01)
*H04L 5/00* (2006.01)
*H04W 72/1268* (2023.01)
*H04W 72/1273* (2023.01)
*H04W 72/23* (2023.01)
*H04W 72/54* (2023.01)

(52) U.S. Cl.
CPC .......... *H04L 1/1819* (2013.01); *H04L 5/0051* (2013.01); *H04W 72/1268* (2013.01); *H04W 72/1273* (2013.01); *H04W 72/23* (2023.01)

(58) Field of Classification Search
CPC ... H04B 7/0639; H04L 1/1819; H04L 1/1607; H04L 1/1854; H04L 1/1861; H04L 1/0031; H04L 5/0051
See application file for complete search history.

(56) References Cited

U.S. PATENT DOCUMENTS

| | | | |
|---|---|---|---|
| 2014/0078942 A1 | 3/2014 | Noh et al. | |
| 2019/0215119 A1* | 7/2019 | Kim | H04L 5/0048 |
| 2019/0306878 A1 | 10/2019 | Zhang et al. | |
| 2020/0107319 A1* | 4/2020 | Bagheri | H04L 1/08 |
| 2020/0112419 A1* | 4/2020 | Bagheri | H04L 1/0026 |
| 2020/0266932 A1 | 8/2020 | Yang et al. | |
| 2022/0360399 A1* | 11/2022 | Zhang | H04L 5/0057 |
| 2022/0361162 A1* | 11/2022 | Zhang | H04L 1/0031 |
| 2022/0377813 A1* | 11/2022 | Wang | H04W 72/0453 |
| 2023/0084145 A1* | 3/2023 | Li | H04L 1/0026 370/329 |
| 2023/0189229 A1* | 6/2023 | Kim | H04L 1/1896 370/329 |
| 2023/0216568 A1* | 7/2023 | Zhang | H04L 5/0057 370/252 |

OTHER PUBLICATIONS

NPL, R1-2005432, ZTE, Discussion on CSI feedback enhancements for eURLLC, 3GPP Tsg ran WG1 #102-e, e-Meeting, Aug. 17-28, 2020 (Year: 2020).*
International Search Report and Written Opinion—PCT/US2021/071905—ISA/EPO—dated May 11, 2022.
Partial International Search Report—PCT/US2021/071905—ISA/EPO—dated Feb. 14, 2022.
Sony: "Considerations on CSI Feedback Enhancements", 3GPP Draft, 3GPP TSG RAN WG1 #102-e, R1-2005570, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), XP051917550, 4 Pages, Retrieved from the Internet: URL: https://ftp.3gpp.org/tsg_ran/WG1_RL1/TSGR1_102-e/Docs/R1-2005570.zip. R1-2005570—Rel-17 eURLLC—CSI Enhancements v04.docx [Retrieved on Aug. 7, 2020] The Whole Document, p. 2, paragraph 1.
Sony: "HARQ-ACK Enhancement to Reduce Retransmission Time", 3GPP Draft, 3GPP TSG RAN WG1 #102-e, R1-2005569, 3rd Generation Partnership Project (3GPP), Mobile Competence Centre, 650, Route Des Lucioles, F-06921 Sophia-Antipolis Cedex, France, vol. RAN WG1. No. e-Meeting, Aug. 17, 2020-Aug. 28, 2020, Aug. 7, 2020 (Aug. 7, 2020), XP051917549, 4 Pages, Retrieved from the Internet: URL: https://ftp.3gpp.org/tsg_ran/WG1_RL1/TSGR1_102-e/Docs/R1-2005569.zip. R1-2005569—Rel-17 eURLLC—HARQ-ACK Enhancements v01.docx [retrieved on Aug. 7, 2020] the whole document, section 2.

* cited by examiner

DIFFERENTIATED CHANNEL STATE INFORMATION FEEDBACK BASED ON DECODING STATISTICS

CROSS-REFERENCE TO RELATED APPLICATION

This application claims priority to U.S. Provisional Patent Application No. 63/093,098, filed on Oct. 16, 2020, entitled "DIFFERENTIATED CHANNEL STATE INFORMATION FEEDBACK BASED ON DECODING STATISTICS," and assigned to the assignee hereof. The disclosure of U.S. Provisional Patent Application No. 63/093,098 is incorporated by reference herein in its entirety.

FIELD OF THE DISCLOSURE

Aspects of the present disclosure generally relate to wireless communication and to techniques and apparatuses for differentiated channel state information feedback based on decoding statistics.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes determining that a communication on a physical downlink shared channel (PDSCH) was successfully decoded or was not successfully decoded, and transmitting channel state information (CSI) feedback that includes PDSCH decoding information via a first operation based at least in part on the determination that the communication was successfully decoded, or via a second operation based at least in part on the determination that the communication was not successfully decoded.

In some aspects, a method of wireless communication performed by a base station includes receiving, from a UE, CSI feedback that includes PDSCH decoding information for a first communication on the PDSCH via a first operation or a second operation, the first operation corresponding to successful decoding of the first communication on the PDSCH, and the second operation corresponding to unsuccessful decoding of the first communication on the PDSCH, and scheduling a second communication on the PDSCH for the UE based at least in part on the PDSCH decoding information.

In some aspects, a UE for wireless communication includes memory, one or more processors coupled to the memory, and instructions stored in the memory and operable, when executed by the one or more processors, to cause the UE to determine that a communication on a PDSCH was successfully decoded or was not successfully decoded, and transmit CSI feedback that includes PDSCH decoding information via a first operation based at least in part on the determination that the communication was successfully decoded, or via a second operation based at least in part on the determination that the communication was not successfully decoded.

In some aspects, a base station for wireless communication includes memory, one or more processors coupled to the memory, and instructions stored in the memory and operable, when executed by the one or more processors, to cause the base station to receive, from a UE, CSI feedback that includes PDSCH decoding information for a first communication on the PDSCH via a first operation or a second operation, the first operation corresponding to successful decoding of the first communication on the PDSCH, and the second operation corresponding to unsuccessful decoding of the first communication on the PDSCH, and schedule a second communication on the PDSCH for the UE based at least in part on the PDSCH decoding information.

In some aspects, a non-transitory computer-readable medium stores one or more instructions for wireless communication that, when executed by one or more processors of a UE, cause the UE to determine that a communication on a PDSCH was successfully decoded or was not successfully decoded, and transmit CSI feedback that includes PDSCH decoding information via a first operation based at least in part on the determination that the communication was successfully decoded, or via a second operation based at least in part on the determination that the communication was not successfully decoded.

In some aspects, a non-transitory computer-readable medium stores one or more instructions for wireless communication that, when executed by one or more processors of a base station, cause the base station to receive, from a UE, CSI feedback that includes PDSCH decoding information for a first communication on the PDSCH via a first operation or a second operation, the first operation corresponding to successful decoding of the first communication on the PDSCH, and the second operation corresponding to unsuccessful decoding of the first communication on the PDSCH, and schedule a second communication on the PDSCH for the UE based at least in part on the PDSCH decoding information.

In some aspects, an apparatus for wireless communication includes means for determining that a communication on a PDSCH was successfully decoded or was not successfully decoded and means for transmitting CSI feedback that includes PDSCH decoding information via a first operation based at least in part on the determination that the communication was successfully decoded, or via a second operation based at least in part on the determination that the communication was not successfully decoded.

In some aspects, an apparatus for wireless communication includes means for receiving, from a UE, CSI feedback that includes PDSCH decoding information for a first communication on the PDSCH via a first operation or a second operation, the first operation corresponding to successful decoding of the first communication on the PDSCH, and the second operation corresponding to unsuccessful decoding of the first communication on the PDSCH, and means for scheduling a second communication on the PDSCH for the UE based at least in part on the PDSCH decoding information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
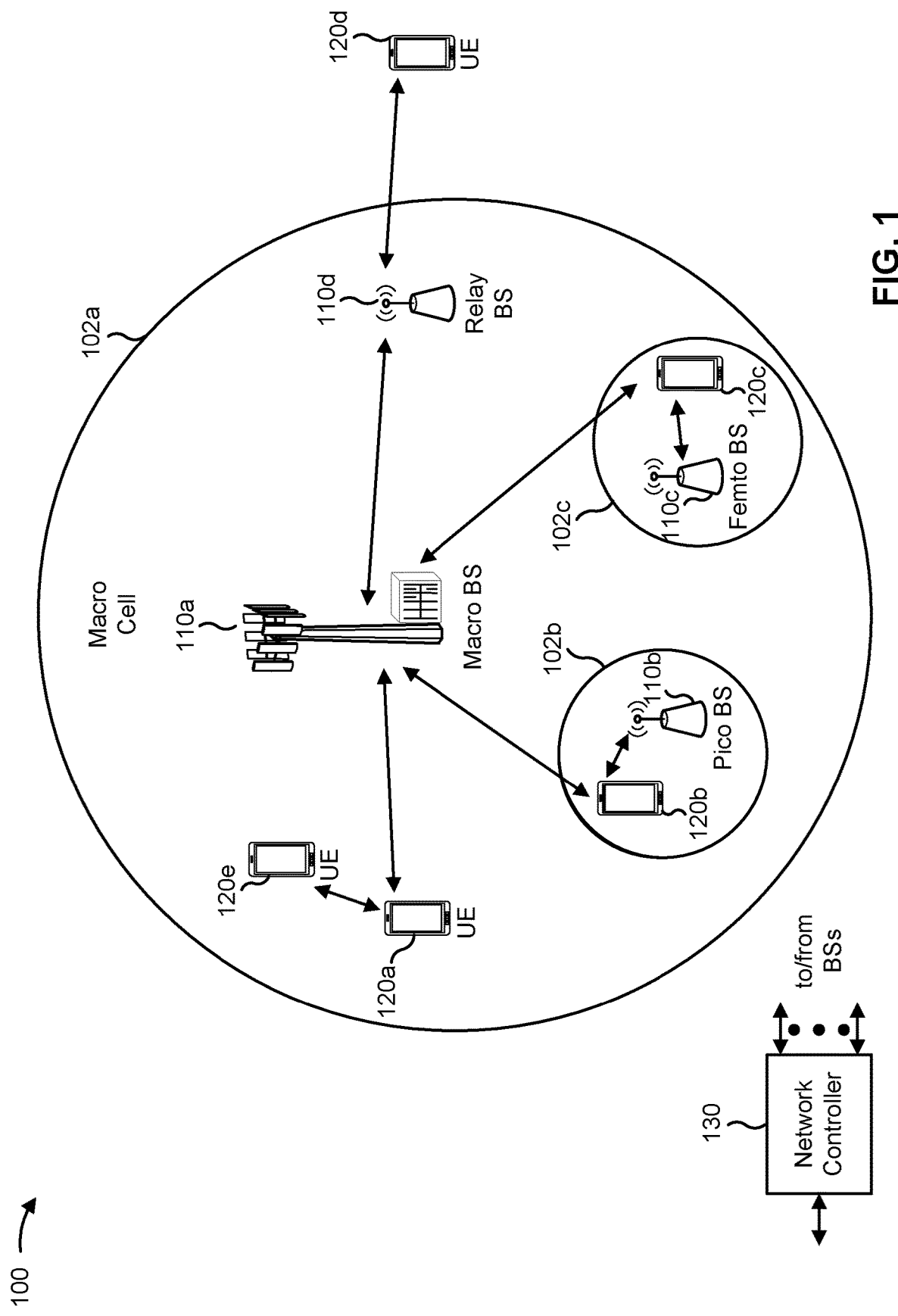
FIG. 1 is a diagram illustrating an example of a wireless network, in accordance with the present disclosure.

A user equipment (UE) may receive a downlink communication on a physical downlink shared channel (PDSCH). The UE may successfully decode the downlink communication or not successfully decode the downlink communication. In some examples, the UE may provide PDSCH decoding statistics so that a base station can adjust a modulation and coding scheme, a resource allocation, and/or a transmit power for a retransmission of the downlink communication or for a new downlink communication. The PDSCH decoding statistics may be transmitted as channel state information (CSI) feedback (e.g., in CSI feedback). However, the CSI feedback based on PDSCH decoding statistics may not be transmitted in a timely or efficient manner. The statistics for an unsuccessful decoding may be received too late to help a future retransmission or other communication to succeed, and unsuccessful communications cause the UE to waste power, processing resources, and signaling resources. By contrast, while PDSCH decoding statistics for successful downlink communications may help the base station to make transmission adjustments, statistics for successful communications do not have the same urgency that is associated with unsuccessful communications.

According to various aspects described herein, a UE may provide PDSCH decoding information (e.g., statistics) in CSI feedback in a different manner for an unsuccessful decoding of a downlink communication than for a successful decoding. For example, the UE may provide PDSCH decoding statistics for an unsuccessful decoding in a physical uplink resource that occurs sooner than a physical uplink resource for a successful decoding, due to the urgency of a failed communication. In some aspects, the UE may aggregate PDSCH decoding statistics for multiple successfully decoded communications. In this way, the UE may quickly and efficiently provide PDSCH decoding statistics for transmission adjustments. As a result, the UE conserves power, processing resources, and signaling resources that would otherwise be consumed by other failed decoding attempts.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
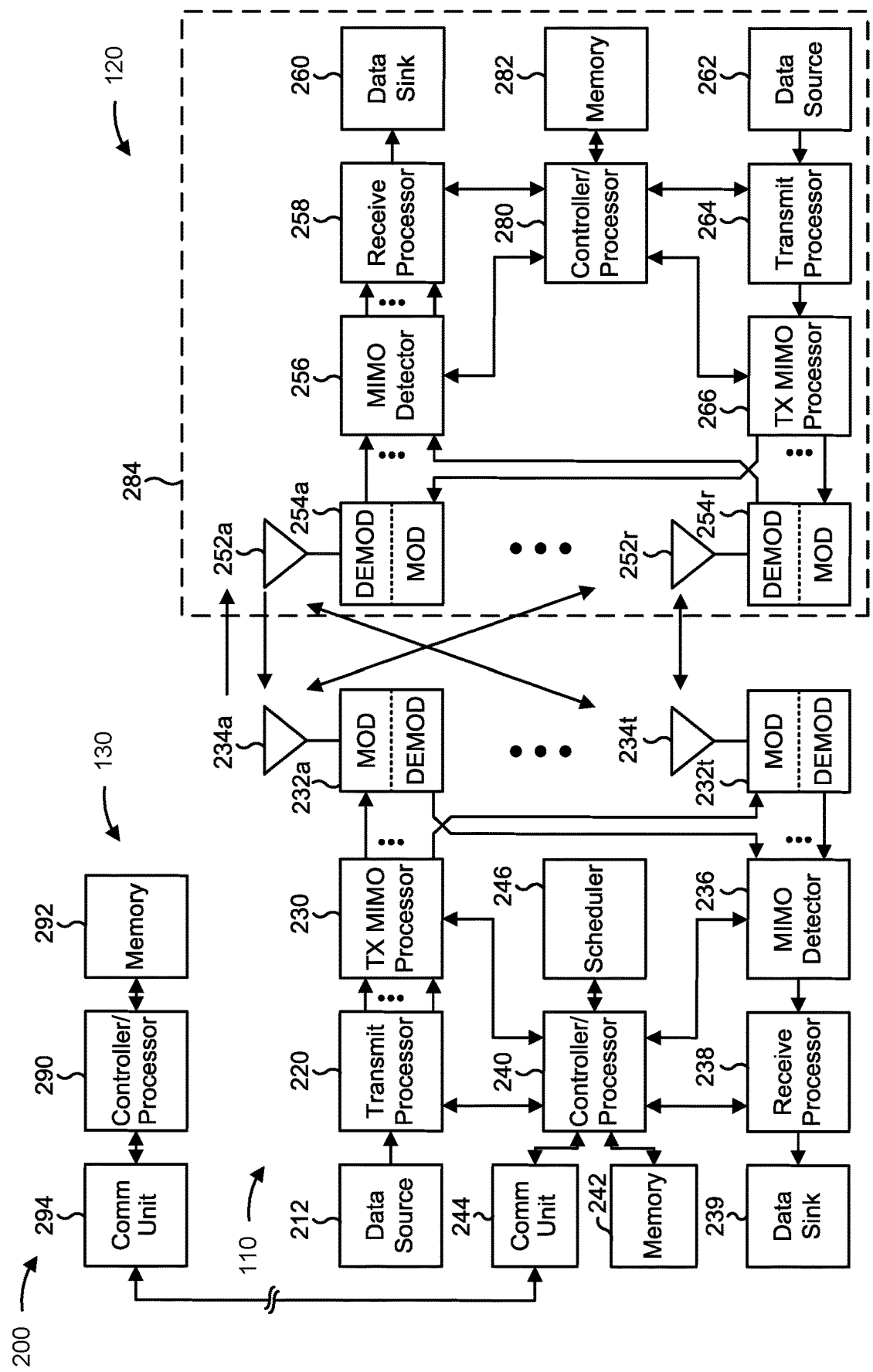
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-15).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-15).

Controller/processor 240 of base station 110, controller/processor 280 of UE 120, and/or any other component(s) of FIG. 2 may perform one or more techniques associated with differentiated CSI feedback based on decoding statistics, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, UE 120 includes means for determining that a communication on a PDSCH was successfully decoded or was not successfully decoded, and/or means for transmitting CSI feedback that includes PDSCH decoding information via a first operation based at least in part on the determination that the communication was successfully decoded, or via a second operation based at least in part on the determination that the communication was not successfully decoded. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, base station 110 includes means for receiving, from a UE, CSI feedback that includes PDSCH decoding information for a first communication on the PDSCH via a first operation or a second operation, the first operation corresponding to successful decoding of the first communication on the PDSCH, and the second operation corresponding to unsuccessful decoding of the first communication on the PDSCH, and/or means for scheduling a second communication on the PDSCH for the UE based at least in part on the PDSCH decoding information. The means for base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, base station 110 includes means for transmitting an uplink grant in a physical downlink resource that schedules a PUSCH resource for receiving CSI feedback that includes decoding information for a plurality of successfully decoded communications on the PDSCH, where receiving the CSI feedback for the plurality of communications via the first operation includes receiving the CSI feedback in the scheduled PUSCH resource.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
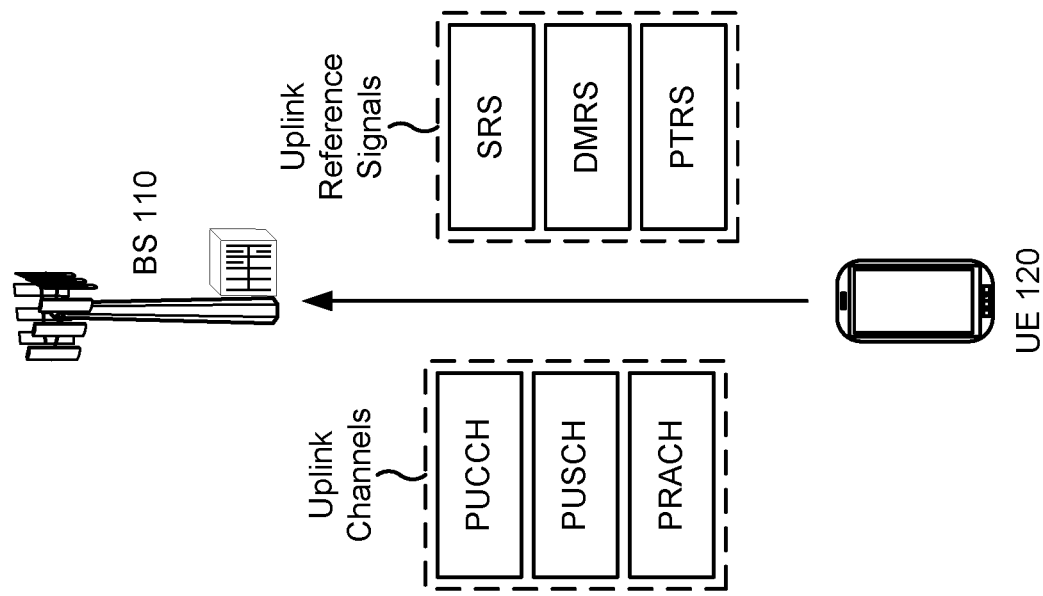
FIG. 3 is a diagram illustrating an example of physical channels and reference signals in a wireless network, in accordance with the present disclosure.
Figure 3:
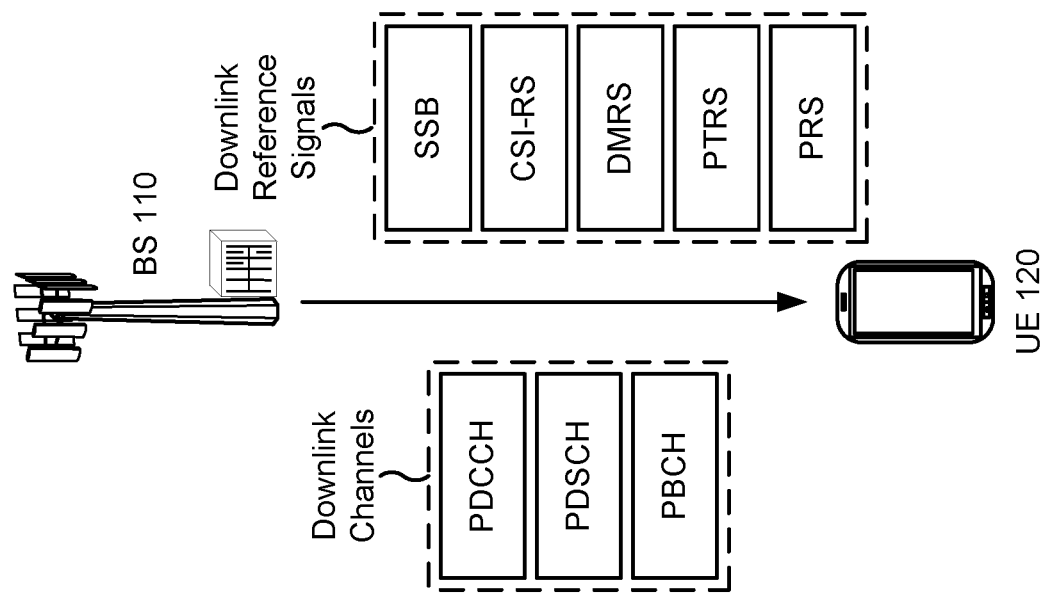

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a PDSCH that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a CSI reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. Base station 110 may configure a set of CSI-RSs for UE 120, and UE 120 may measure the configured set of CSI-RSs. Based at least in part on the measurements, UE 120 may perform channel estimation and may report channel estimation parameters to base station 110 (e.g., in a CSI report), such as a CQI, a precoding matrix indicator (PMI), a CSI-RS resource indicator (CRI), a layer indicator (LI), a rank indicator (RI), or a reference signal received power (RSRP), among other examples. Base station 110 may use the CSI report to select transmission parameters for downlink communications to UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of UE 120 based on signals transmitted by base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by UE 120, which may need to detect downlink signals from multiple neighboring base stations in order to perform OTDOA-based positioning. Accordingly, UE 120 may receive a PRS from multiple cells (e.g., a reference cell and one or more neighbor cells), and may report a reference signal time difference (RSTD) based on OTDOA measurements associated with the PRSs received from the multiple cells. In some aspects, base station 110 may then calculate a position of UE 120 based on the RSTD measurements reported by UE 120.

An SRS may carry information used for uplink channel estimation, which may be used for scheduling, link adaptation, precoder selection, or beam management, among other examples. Base station 110 may configure one or more SRS resource sets for UE 120, and UE 120 may transmit SRSs on the configured SRS resource sets. An SRS resource set may have a configured usage, such as uplink CSI acquisition, downlink CSI acquisition for reciprocity-based operations, uplink beam management, among other examples. Base station 110 may measure the SRSs, may perform channel estimation based at least in part on the measurements, and may use the SRS measurements to configure communications with UE 120.

As indicated above, FIG. 3 is provided as an example. Other examples may differ from what is described with regard to FIG. 3.

Figure 4:
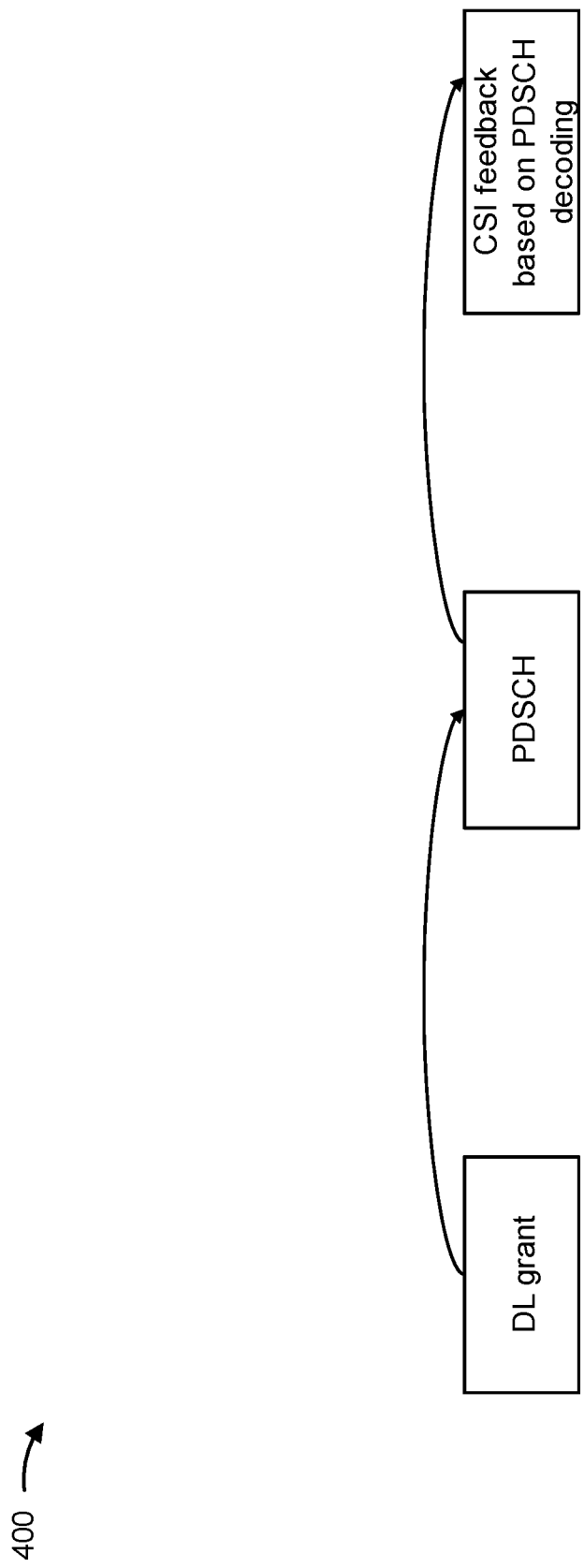
FIG. 4 is a diagram illustrating an example of providing physical downlink shared channel (PDSCH) decoding in channel state information (CSI) feedback, in accordance with the present disclosure.

FIG. 4 is a diagram illustrating an example 400 of providing PDSCH decoding in CSI feedback, in accordance with the present disclosure.

A UE may receive a downlink communication on a PDSCH. As shown by example 400, the downlink communication on the PDSCH may be scheduled by a downlink grant. The downlink grant may be received in DCI. The UE may successfully decode the downlink communication and may provide an ACK in a PUCCH resource that is for HARQ feedback. If the UE does not successfully decode the downlink communication, the UE may provide a NACK in the HARQ feedback PUCCH resource. In some examples, the UE may provide PDSCH decoding statistics, as shown by example 400, so that a base station can adjust an MCS, a resource allocation, and/or a transmit power for a retransmission of the downlink communication or for a new downlink communication. The PDSCH decoding statistics may be transmitted in CSI feedback.

As indicated above, FIG. 4 is provided as an example. Other examples may differ from what is described with regard to FIG. 4.

Figure 5:
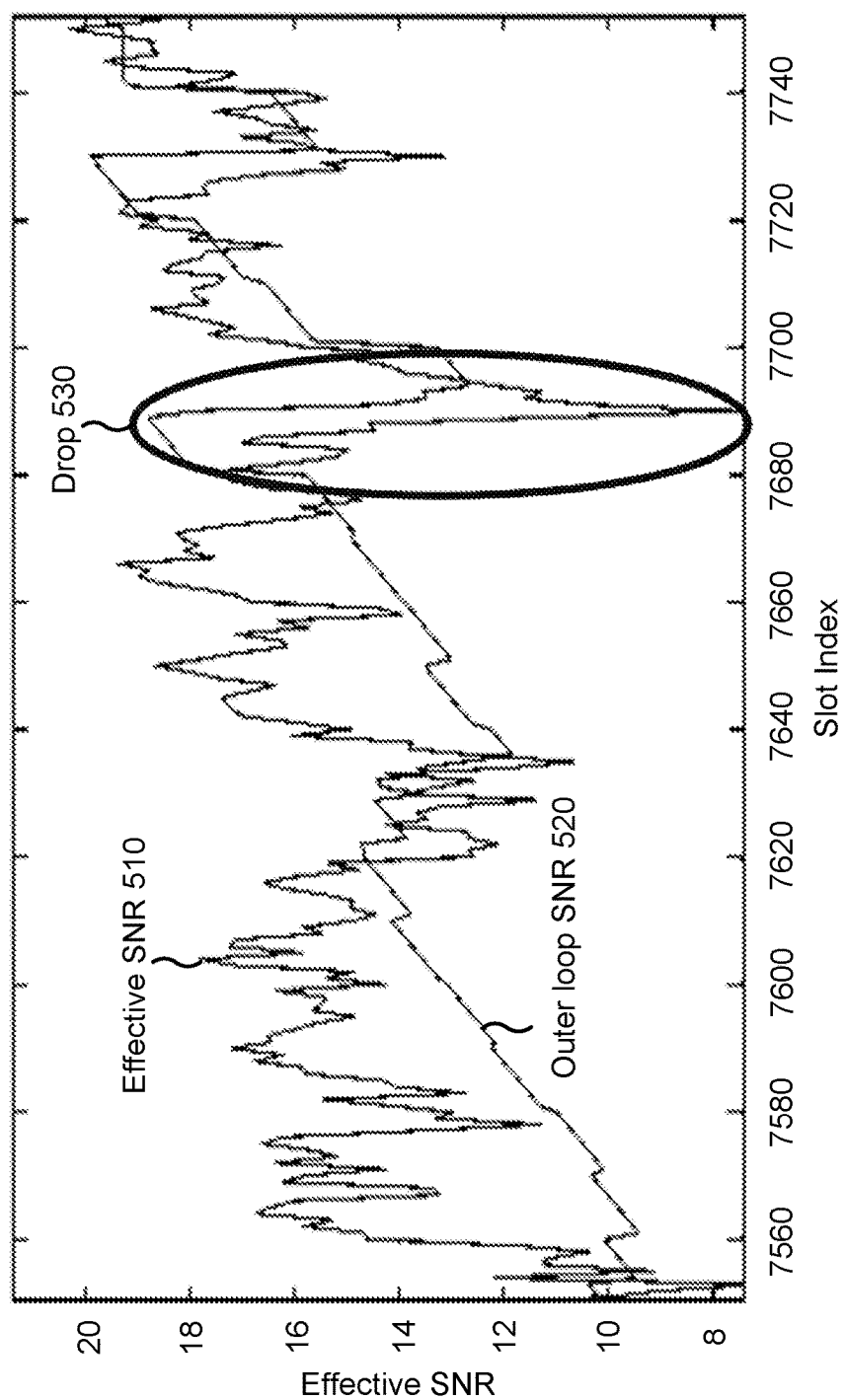
FIG. 5 is a diagram illustrating an example of an effective signal to noise ratio (SNR) and an outer loop SNR, in accordance with the present disclosure.

FIG. 5 is a diagram illustrating an example 500 of an effective SNR and an outer loop SNR, in accordance with the present disclosure.

While a UE may transmit PDSCH decoding statistics in CSI feedback, the UE may not transmit the statistics in a timely or efficient manner. The statistics for unsuccessful decoding may be received too late to help a future retransmission to succeed, and unsuccessful communications cause the UE to waste power, processing resources, and signaling resources. By contrast, while PDSCH decoding statistics for successful downlink communications may help a base station to make transmission adjustments, statistics for successful communications do not have the same urgency that is associated with unsuccessful communications.

Example 500 shows an example of a difference in urgency between a successful decoding (e.g., ACK) and an unsuccessful decoding (e.g., NACK). An outer loop SNR 520 may be part of a feedback loop that is associated with an effective SNR 510. The outer loop may be adapted for MCS selection. With a NACK, a CQI may be fed back immediately to adjust SNR, because an outer-loop SNR based on only HARQ-ACK may not provide the information necessary for quick and effective transmission adjustment. With an ACK, a CQI may be delayed because an outer-loop SNR based on only on HARQ-ACK feedback may be enough for adjustment. Example 500 shows a graph that is based on the following equation:

$$SNR(i)=SNR_{CQI}+\Delta_{offset}(i)$$

with $\Delta_{offset}(i)=\min\{\Delta_{offset}(i-1)+\delta \cdot 1_{ACK}-9\delta \cdot 1_{NACK}, \text{offset}_{max}\}$.

The $\Delta_{offset}$ is accumulative, and the $\delta$ is a step size. Note that with each NACK, there is a larger drop 530 in outer loop SNR 520.

According to various aspects described herein, a UE may provide PDSCH decoding information (e.g., statistics) in CSI feedback in a different manner for unsuccessful decoding than for successful decoding. For example, the UE may provide PDSCH decoding statistics for an unsuccessful decoding in a physical uplink resource that occurs sooner than a physical uplink resource for a successful decoding, due to the urgency of a failed communication. In some aspects, the UE may also aggregate PDSCH decoding statistics for multiple successfully decoded communications. In this way, the UE may quickly and efficiently provide PDSCH decoding statistics for transmission adjustments. As a result, the UE conserves power, processing resources, and signaling resources that would otherwise be consumed by other failed decoding attempts.

As indicated above, FIG. 5 is provided as an example. Other examples may differ from what is described with regard to FIG. 5.

Figure 6:
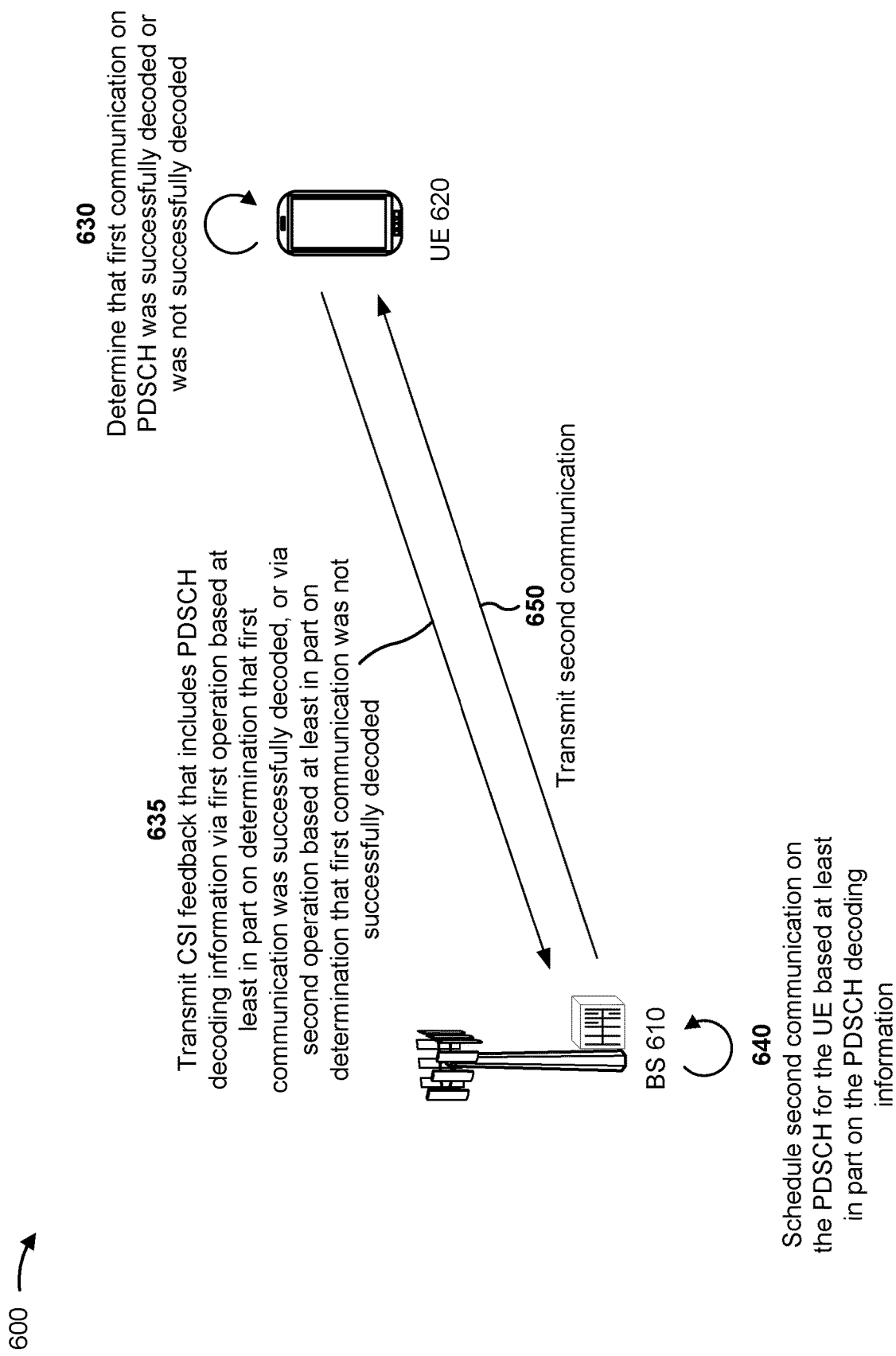
FIG. 6 is a diagram illustrating an example of differentiated CSI feedback for PDSCH decoding statistics, in accordance with the present disclosure.

FIG. 6 is a diagram illustrating an example 600 of differentiated CSI feedback for PDSCH decoding statistics, in accordance with the present disclosure. FIG. 6 shows a BS 610 (e.g., a BS 110 depicted in FIGS. 1 and 2) and a UE 620 (e.g., a UE 120 depicted in FIGS. 1 and 2) that may communicate with each other on a downlink or an uplink.

As shown by reference number 630, UE 620 may determine that a downlink communication on a PDSCH was successfully decoded or was not successfully decoded. UE 620 may determine to transmit an ACK for a successful decoding and a NACK for an unsuccessful decoding. UE 620 may determine PDSCH decoding information associated with decoding the downlink communication. PDSCH decoding information may include PDSCH decoding statistics, such as bit error rate, a decoding signal to noise ratio (SNR), a log-likelihood ratio (LLR), and/or an RSRP. In some aspects, the UE may reuse a CQI or PMI for PDSCH decoding statistics. The PDSCH decoding information may include a CQI that represents one or more parameters of PDSCH decoding. The PDSCH decoding information may also include a PMI that represents one or more measurements of DMRSs in the communication.

UE 620 may transmit the PDSCH decoding information in one or more fields regularly used for CSI feedback. As shown by reference number 635, UE 620 may transmit CSI feedback that includes PDSCH decoding information via a first operation based at least in part on the determination that the communication was successfully decoded, or via a second operation based at least in part on the determination that communication was not successfully decoded. A time duration between reception of the communication and transmission of the CSI feedback may be shorter for the second operation than for the first operation. For example, UE 620 may transmit CSI feedback at a different time and/or in a different resource for successful decoding than for an unsuccessful decoding. As another example, if the CSI feedback that includes PDSCH decoding information is transmitted based at least in part on the determination that the communication was successfully decoded, then a first time duration may exist between reception of the communication and transmission of the CSI feedback that includes PDSCH decoding information; and if the CSI feedback that includes PDSCH decoding information is transmitted based at least in part on the determination that the communication was unsuccessfully decoded, then a second time duration may exist between reception of the communication and transmission of the CSI feedback that includes PDSCH decoding information, where the second time duration may be less than (e.g., shorter) than the first time duration. The first operation may involve transmitting CSI feedback in a first physical uplink resource, and the second operation may involve transmitting CSI feedback in a second physical uplink resource, where the second physical uplink resource occurs earlier than the first physical uplink resource. Examples of different operations for differentiated transmission of the CSI feedback are described below in connection with FIGS. 7-11.

As shown by reference number 640, BS 610 may receive the CSI feedback and make an adjustment for transmission based at least in part on PDSCH decoding statistics indicated by the CSI feedback. For example, BS 610 may schedule a communication on the PDSCH for UE 620 based at least in part on the PDSCH decoding information. The communication may be a retransmission or a new communication. As shown by reference number 650, BS 610 may transmit the communication.

As indicated above, FIG. 6 is provided as an example. Other examples may differ from what is described with regard to FIG. 6.

Figure 7:
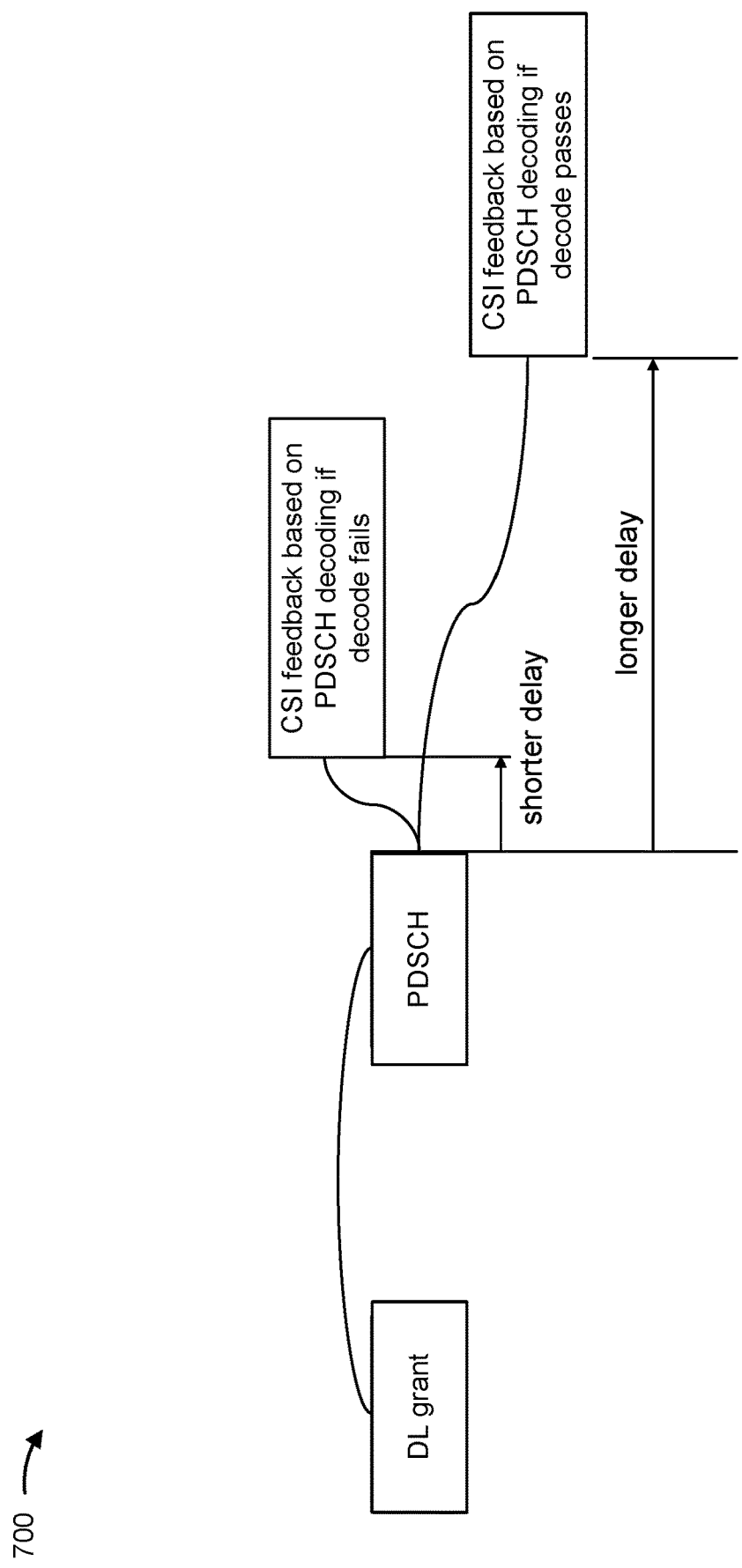
FIG. 7 is a diagram illustrating an example of differentiated CSI feedback for PDSCH decoding statistics, in accordance with the present disclosure.

FIG. 7 is a diagram illustrating an example 700 of differentiated CSI feedback for PDSCH decoding statistics, in accordance with the present disclosure.

In some aspects, a UE may transmit CSI feedback that includes PDSCH decoding statistics for a successful decoding on a different timeline than CSI feedback that includes PDSCH decoding statistics for an unsuccessful decoding. Example 700 shows a faster timeline (shorter delay) for CSI feedback if the PDSCH decoding fails (e.g., NACK). Example 700 shows a slower timeline (longer delay) for CSI feedback if the PDSCH decoding passes (e.g., ACK).

As indicated above, FIG. 7 is provided as an example. Other examples may differ from what is described with regard to FIG. 7.

Figure 8:
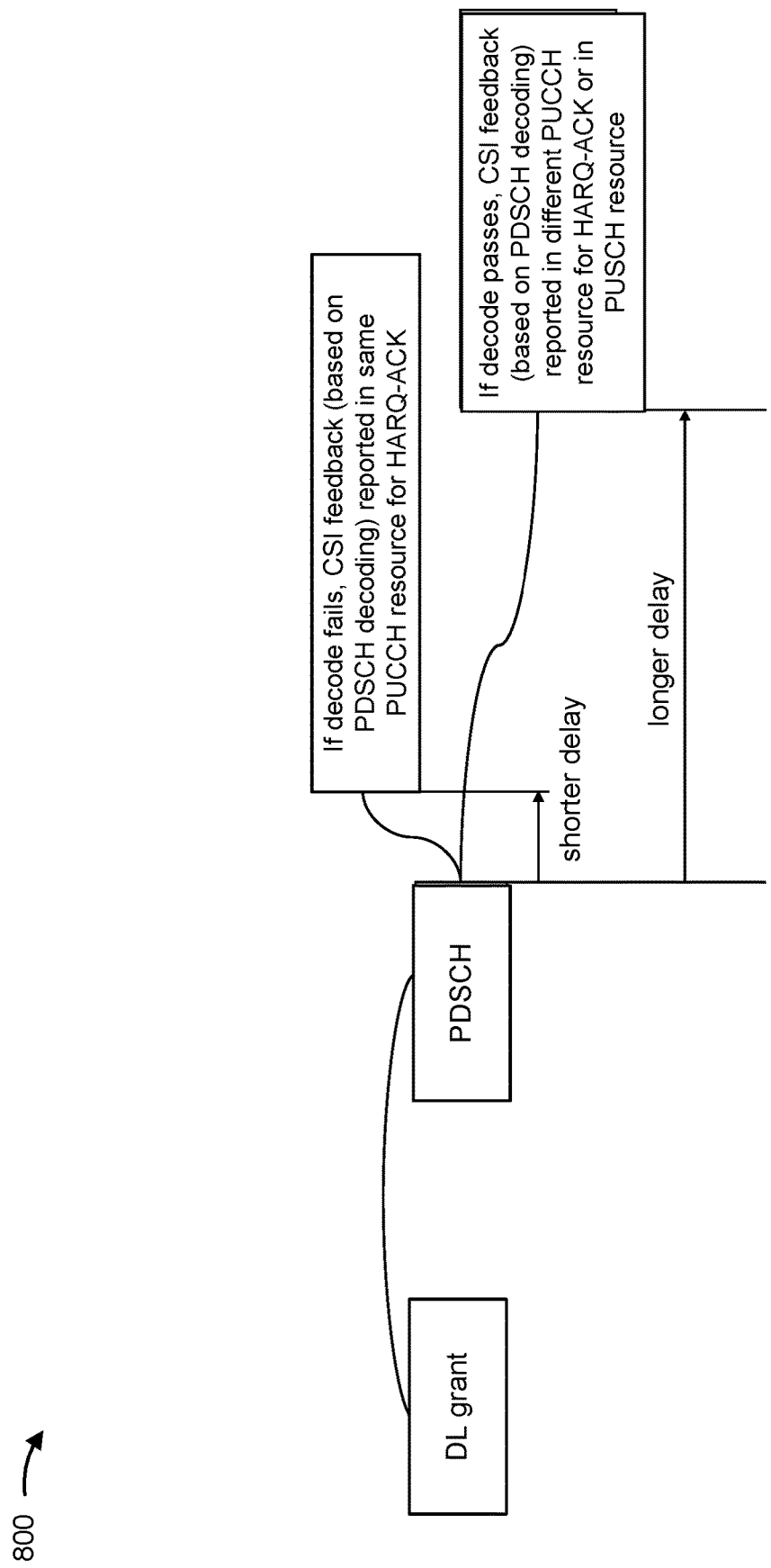
FIG. 8 is a diagram illustrating an example of differentiated CSI feedback for PDSCH decoding statistics, in accordance with the present disclosure.

FIG. 8 is a diagram illustrating an example 800 of differentiated CSI feedback for PDSCH decoding statistics, in accordance with the present disclosure.

In some aspects, a UE may transmit CSI feedback that includes PDSCH decoding statistics for a successful decoding of a communication on a different resource than CSI feedback for an unsuccessful decoding. Example 800 shows that if PDSCH decoding of the communication fails, the UE may transmit the CSI feedback on a PUCCH resource that is the same PUCCH resource carrying the HARQ-ACK feedback (e.g., NACK). A delay from the communication to the PUCCH resource with the NACK and CSI feedback may include a delay (e.g., legacy K1 delay) indicated by a field in DCI that schedules the communication.

If the PDSCH decoding passes (e.g., ACK), the UE may transmit the CSI feedback for the PDSCH decoding statistics in a different PUCCH resource than used for the HARQ-ACK feedback. In some aspects, the UE may transmit the CSI feedback in a PUSCH resource.

As indicated above, FIG. 8 is provided as an example. Other examples may differ from what is described with regard to FIG. 8.

Figure 9:
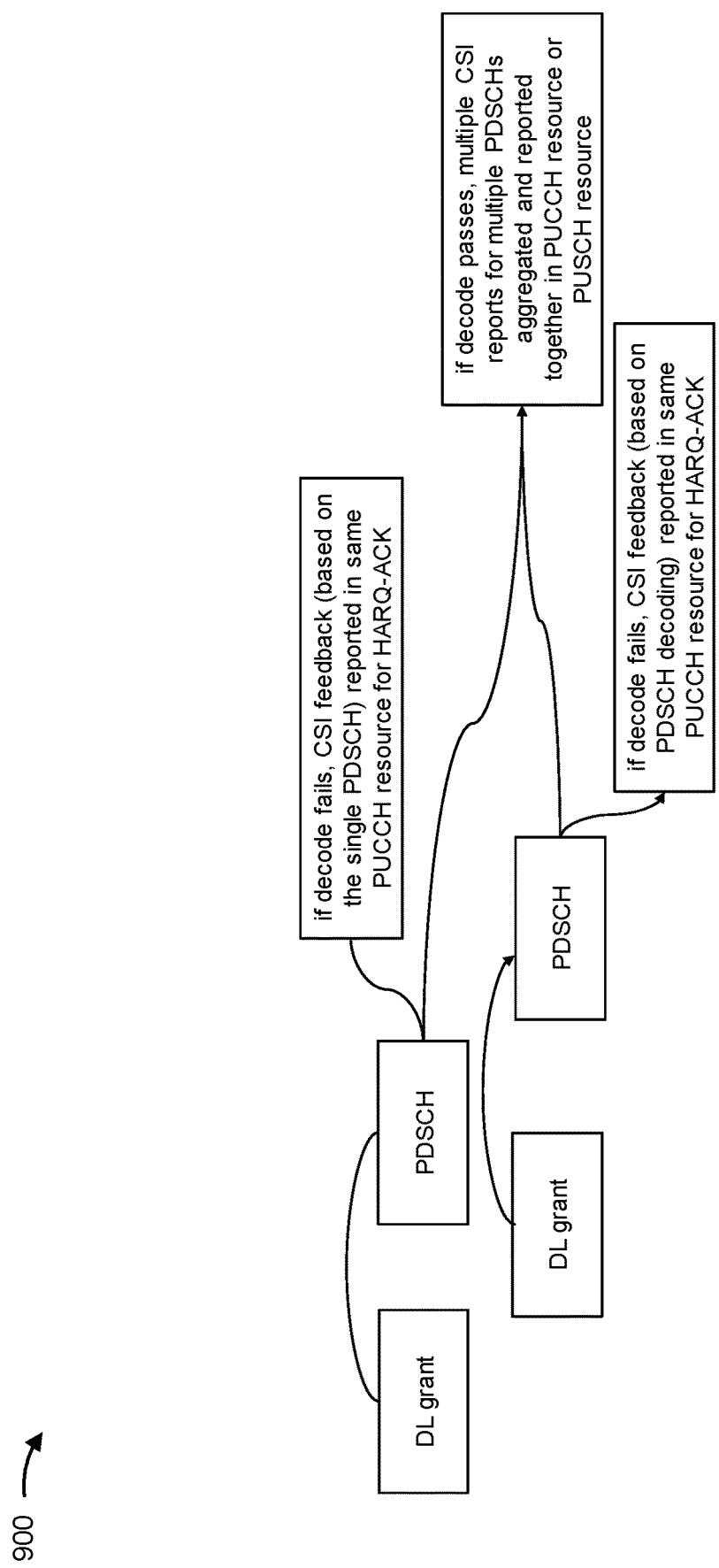
FIG. 9 is a diagram illustrating an example of differentiated CSI feedback for PDSCH decoding statistics, in accordance with the present disclosure.

FIG. 9 is a diagram illustrating an example 900 of differentiated CSI feedback for PDSCH decoding statistics, in accordance with the present disclosure.

In some aspects, a UE may transmit CSI feedback that includes PDSCH decoding statistics for a successful decoding of a communication with a different granularity than CSI feedback for an unsuccessful decoding. Example 900 shows that if the PDSCH decoding fails, the UE may transmit CSI feedback for a single communication in a PUCCH resource. The PUCCH resource may be a HARQ feedback PUCCH resource. If the PDSCH decoding passes, the UE may transmit CSI feedback for PDSCH decoding for multiple communications that were successfully decoded. In some aspects, the UE may aggregate multiple CSI reports for multiple successfully decoded communications (e.g., a respective CSI report for a respective communication) in a single PUCCH resource or a single PUSCH resource. In some aspects, the UE may concatenate the multiple CSI reports. In some aspects, the UE may aggregate CSI feedback for multiple communications into a single CSI report.

As indicated above, FIG. 9 is provided as an example. Other examples may differ from what is described with regard to FIG. 9.

Figure 10:
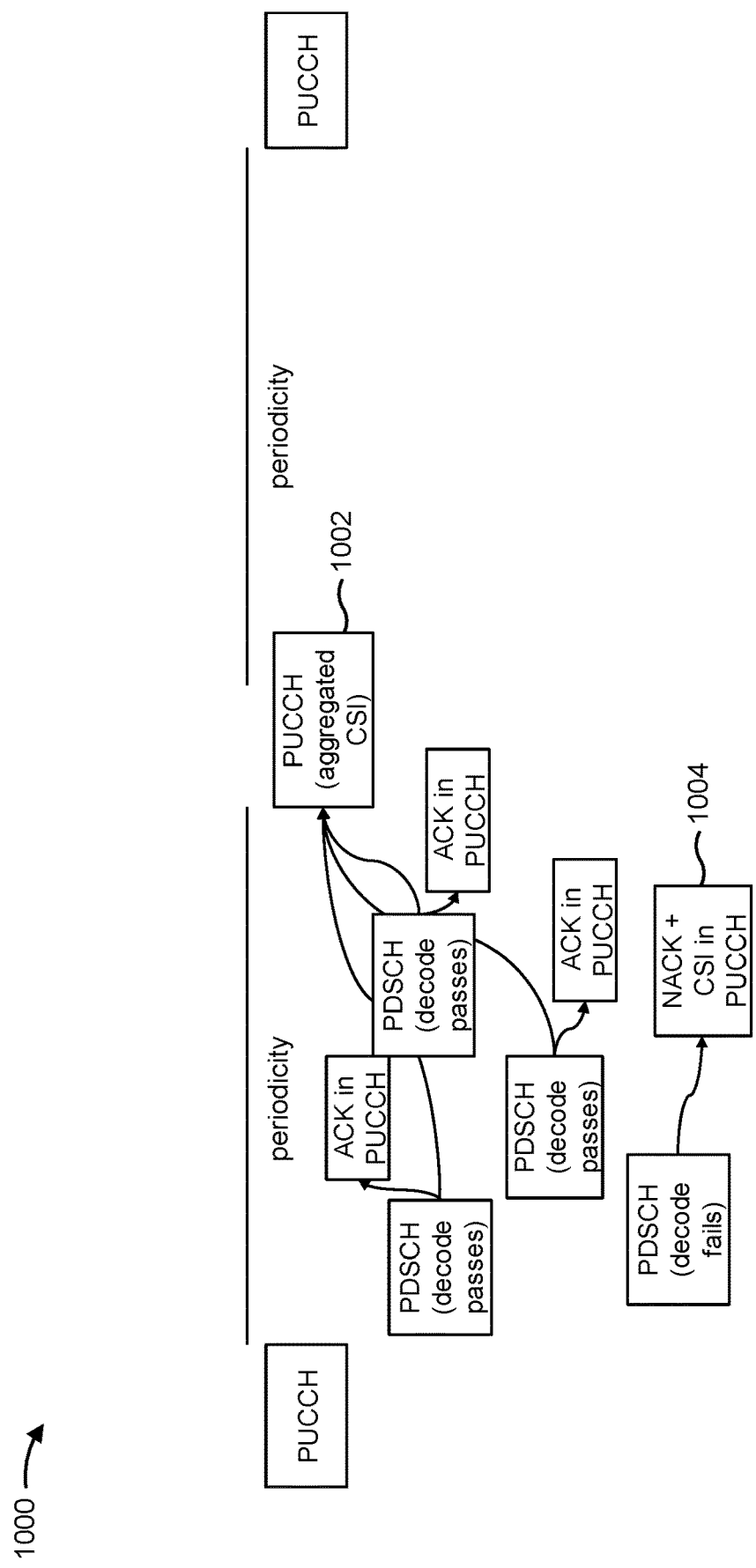
FIG. 10 is a diagram illustrating an example of differentiated CSI feedback for PDSCH decoding statistics, in accordance with the present disclosure.

FIG. 10 is a diagram illustrating an example 1000 of differentiated CSI feedback for PDSCH decoding statistics, in accordance with the present disclosure.

In some aspects, a UE may be configured with periodic resource allocations for transmission. Example 1000 shows periodic PUCCH resources. The UE may aggregate one or more CSI reports of PDSCH decoding statistics for successfully decoded communications into one 1002 of these periodic PUCCH resources. By contrast, the UE may include CSI feedback for unsuccessfully decoded communications in a HARQ feedback PUCCH resource 1004.

As indicated above, FIG. 10 is provided as an example. Other examples may differ from what is described with regard to FIG. 10.

Figure 11:
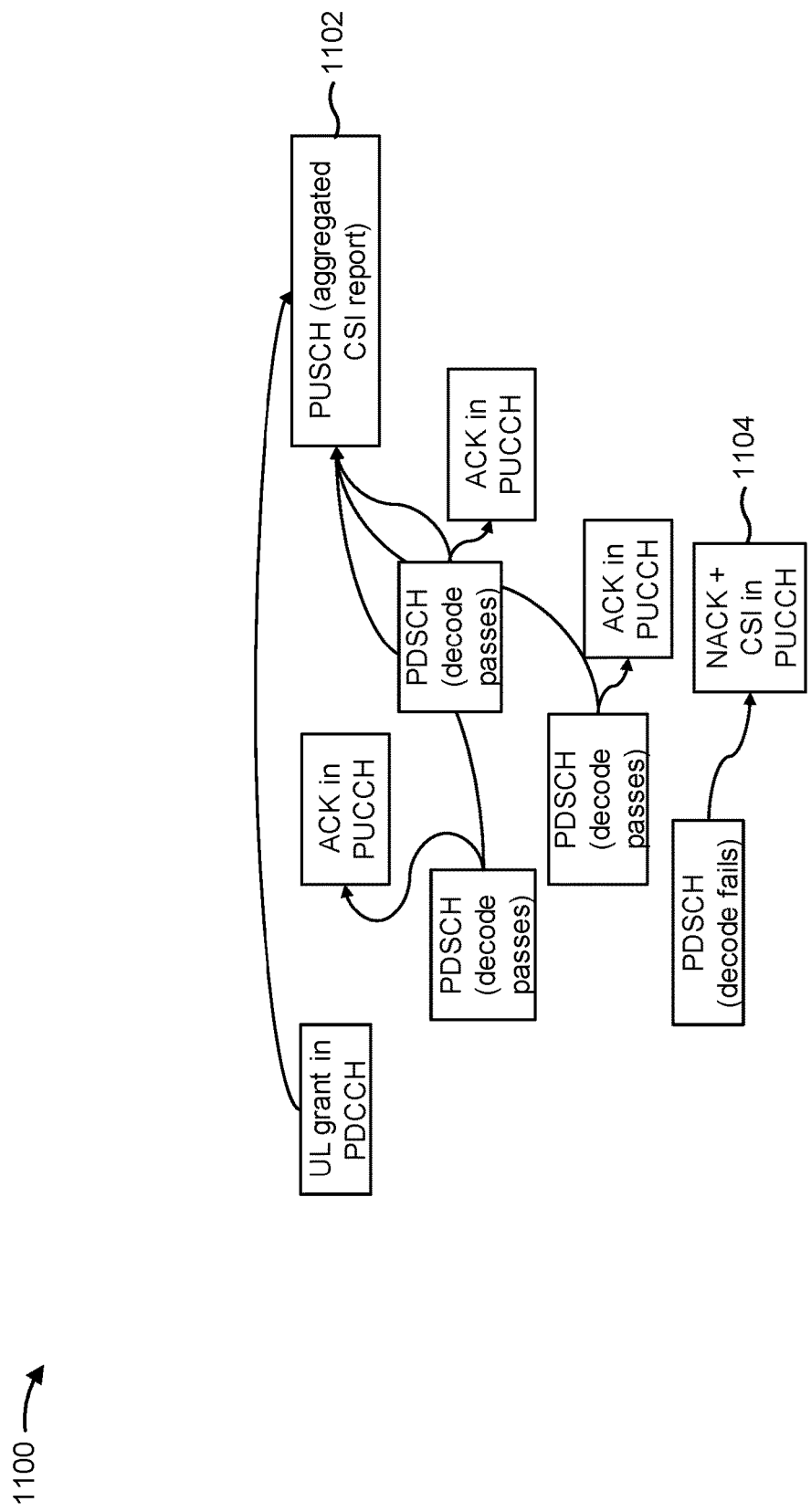
FIG. 11 is a diagram illustrating an example of differentiated CSI feedback for PDSCH decoding statistics, in accordance with the present disclosure.

FIG. 11 is a diagram illustrating an example 1100 of differentiated CSI feedback for PDSCH decoding statistics, in accordance with the present disclosure.

A base station may transmit a configured grant (CG) configuration to a UE. For example, the base station may transmit configuration information in a radio resource configuration (RRC) message or in DCI that identifies the CG. In some aspects, the configuration information identifying the CG may indicate a resource allocation (e.g., in a time domain, frequency domain, spatial domain, code domain) dedicated for the UE to use for transmitting uplink communications. The CG may identify a resource or set of resources available to the UE for transmission of an uplink communication (e.g., data, control information). For example, the CG configuration may identify a resource location for a PUSCH.

In some aspects, as shown in example 1100, a base station may use an uplink grant to trigger a UE to report an aggregated report of PDSCH decoding statistics in CSI feedback for a certain quantity N (e.g., 3) of successfully decoded communications. The report may be an aggregated report that includes a concatenation of multiple reports based on multiple successfully decoded communications. Alternatively, the report may include a single CSI report for the multiple communications. As shown in example 1100, the UE may transmit the report in a PUSCH resource 1102 scheduled by an uplink grant on a PDCCH.

By contrast, the UE may transmit a report of PDSCH decoding statistics in CSI feedback for unsuccessfully decoded communications in a HARQ PUCCH resource 1104, which may occur earlier than a scheduled PUSCH resource for the CSI feedback for successful communications. In this way, the base station may get PDSCH decoding statistics in a timely and efficient manner, depending on whether the PDSCH decoding is successful.

As indicated above, FIG. 11 is provided as an example. Other examples may differ from what is described with regard to FIG. 11.

Figure 12:
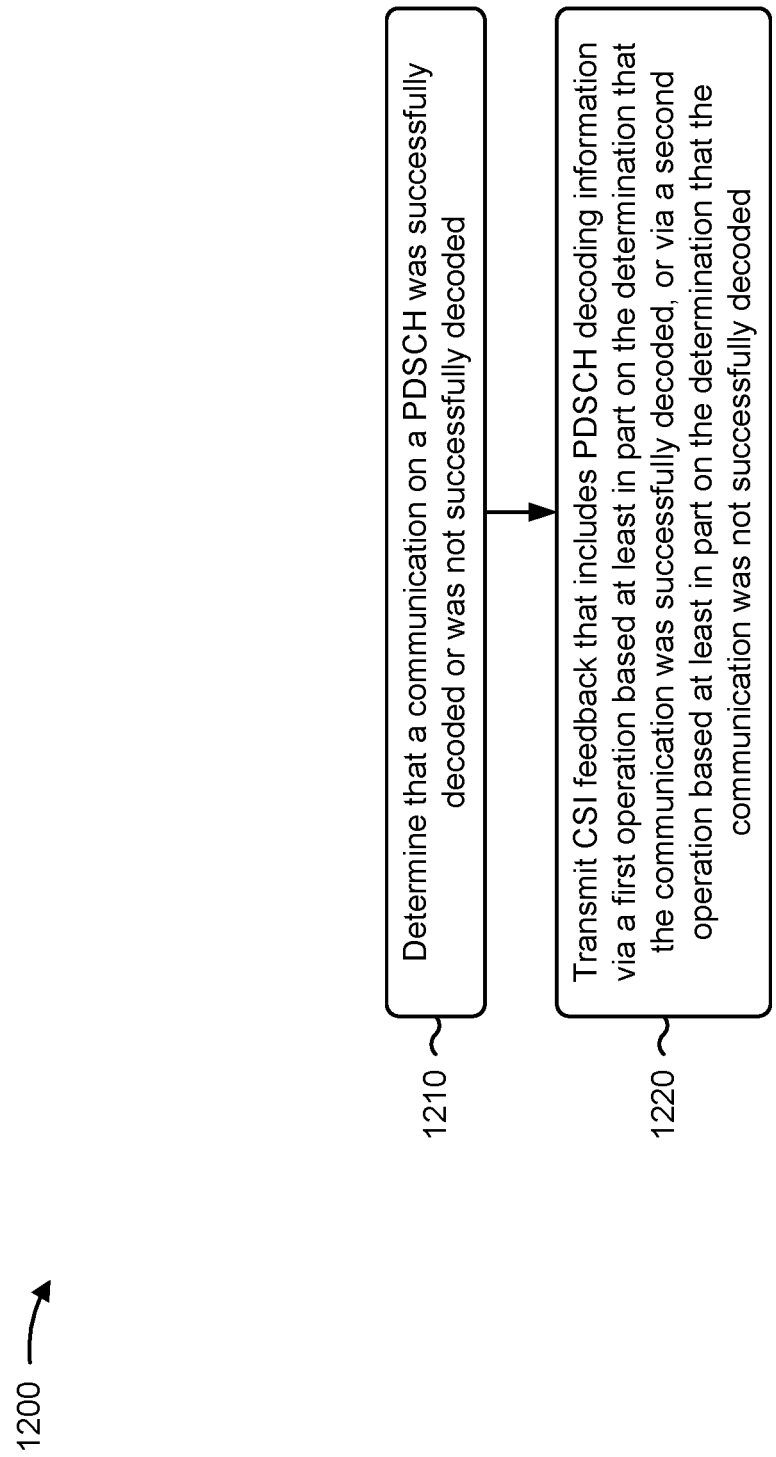
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., a UE 120 depicted in FIGS. 1-3, UE 620 depicted in FIG. 6) performs operations associated with differentiated CSI feedback based on decoding statistics.

As shown in FIG. 12, in some aspects, process 1200 may include determining whether a communication on a PDSCH is successfully decoded (block 1210). For example, the UE (e.g., using determination component 1408 depicted in FIG. 14) may determine whether a communication on a PDSCH is successfully decoded, as described above. This may include determining that a communication on a PDSCH was successfully decoded or was not successfully decoded.

As further shown in FIG. 12, in some aspects, process 1200 may include transmitting CSI feedback that includes PDSCH decoding information via a first operation based at least in part on the determination that the communication was successfully decoded, or via a second operation based at least in part on the determination that the communication was not successfully decoded (block 1220). For example, the UE (e.g., using transmission component 1404 depicted in FIG. 14) may transmit CSI feedback that includes PDSCH decoding information via a first operation based at least in part on the determination that the communication was successfully decoded, or via a second operation based at least in part on the determination that the communication was not successfully decoded, as described above.

Process 1200 may include additional aspects, such as any single aspect or any combination of aspects described below and/or in connection with one or more other processes described elsewhere herein.

In a first aspect, a time duration between reception of the communication and transmission of the CSI feedback for the second operation is shorter than a time duration between reception of the communication and transmission of the CSI feedback for the first operation. In some aspects, a time duration between reception of the communication and transmission of the CSI feedback is shorter for the second operation than for the first operation. In some aspects, if the CSI feedback that includes the PDSCH decoding information is transmitted via the first operation, then a first time duration exists between reception of the communication and transmission of the CSI feedback. If the CSI feedback that includes the PDSCH decoding information is transmitted via the second operation, then a second time duration exists between reception of the communication and transmission of the CSI feedback. The second time duration is shorter than the first time duration.

In some aspects, a physical uplink resource for the CSI feedback for the first operation is different than a physical uplink resource for the CSI feedback for the second operation. In a second aspect, alone or in combination with the first aspect, a physical uplink resource for the CSI feedback for the first operation occurs after a physical uplink resource for the CSI feedback for the second operation. In some aspects, a first physical uplink resource is used if the CSI feedback is transmitted via the first operation and a second physical uplink resource is used if the CSI feedback is transmitted via the second operation. The first physical uplink resource occurs after the second physical uplink resource.

In a third aspect, alone or in combination with one or more of the first and second aspects, the physical uplink resource for the first operation is a HARQ feedback PUCCH resource that occurs after a HARQ feedback PUCCH resource for the second operation, or a PUSCH resource that occurs after the HARQ feedback PUCCH resource for the second operation. That is, a first physical uplink resource is used if the CSI feedback is transmitted via the first operation and a second physical uplink resource is used if the CSI feedback is transmitted via the second operation, and the first physical uplink resource occurs after the second physical uplink resource. In some aspects, the first physical uplink resource is a HARQ feedback PUCCH resource or a PUSCH resource, and the second physical uplink resource is a HARQ feedback PUCCH resource.

In a fourth aspect, alone or in combination with one or more of the first through third aspects, a delay between the communication and the HARQ feedback PUCCH resource for the second operation is indicated by a field in DCI scheduling the communication or based at least in part on a K1 duration.

In a fifth aspect, alone or in combination with one or more of the first through fourth aspects, the physical uplink resource for the second operation is a HARQ feedback PUCCH resource, and the physical uplink resource for the first operation is a physical uplink resource, that occurs after the physical uplink resource for the second operation, that includes PDSCH decoding information for a plurality of communications on the PDSCH that have been successfully decoded. That is, in some aspects, the first physical uplink resource includes PDSCH decoding information for a plurality of communications on the PDSCH that have been successfully decoded, and the second physical uplink resource is a hybrid automatic repeat request (HARQ) feedback physical uplink control channel (PUCCH) resource. The first physical uplink resource occurs after the second physical uplink resource.

In a sixth aspect, alone or in combination with one or more of the first through fifth aspects, the CSI feedback for the first operation includes PDSCH decoding information for a plurality of communications on the PDSCH that have been successfully decoded, wherein the plurality of communications includes the communication.

In a seventh aspect, alone or in combination with one or more of the first through sixth aspects, the CSI feedback for the first operation includes a respective PDSCH decoding information report for each respective communication of the plurality of communications.

In an eighth aspect, alone or in combination with one or more of the first through seventh aspects, the CSI feedback for the first operation includes a single PDSCH decoding information report for the plurality of communications.

In a ninth aspect, alone or in combination with one or more of the first through eighth aspects, transmitting the CSI feedback for the plurality of communications via the first operation includes transmitting the CSI feedback in a periodic PUCCH resource.

In a tenth aspect, alone or in combination with one or more of the first through ninth aspects, transmitting the CSI feedback for the plurality of communications via the first operation includes transmitting the CSI feedback in a PUSCH resource that is scheduled by an uplink grant in a physical downlink resource.

In an eleventh aspect, alone or in combination with one or more of the first through tenth aspects, the uplink grant is dedicated for PDSCH decoding information transmitted in the CSI feedback.

In a twelfth aspect, alone or in combination with one or more of the first through eleventh aspects, the uplink grant indicates a quantity of PDSCH decoding reports for successfully decoded communications on the PDSCH that are to be aggregated in the PUSCH resource that is scheduled by the uplink grant.

In a thirteenth aspect, alone or in combination with one or more of the first through twelfth aspects, the PDSCH decoding information includes one or more of a bit error rate, a decoding LLR, an SNR, a CQI that represents PDSCH decoding statistics, a PMI that represents PDSCH decoding statistics, or an RSRP.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
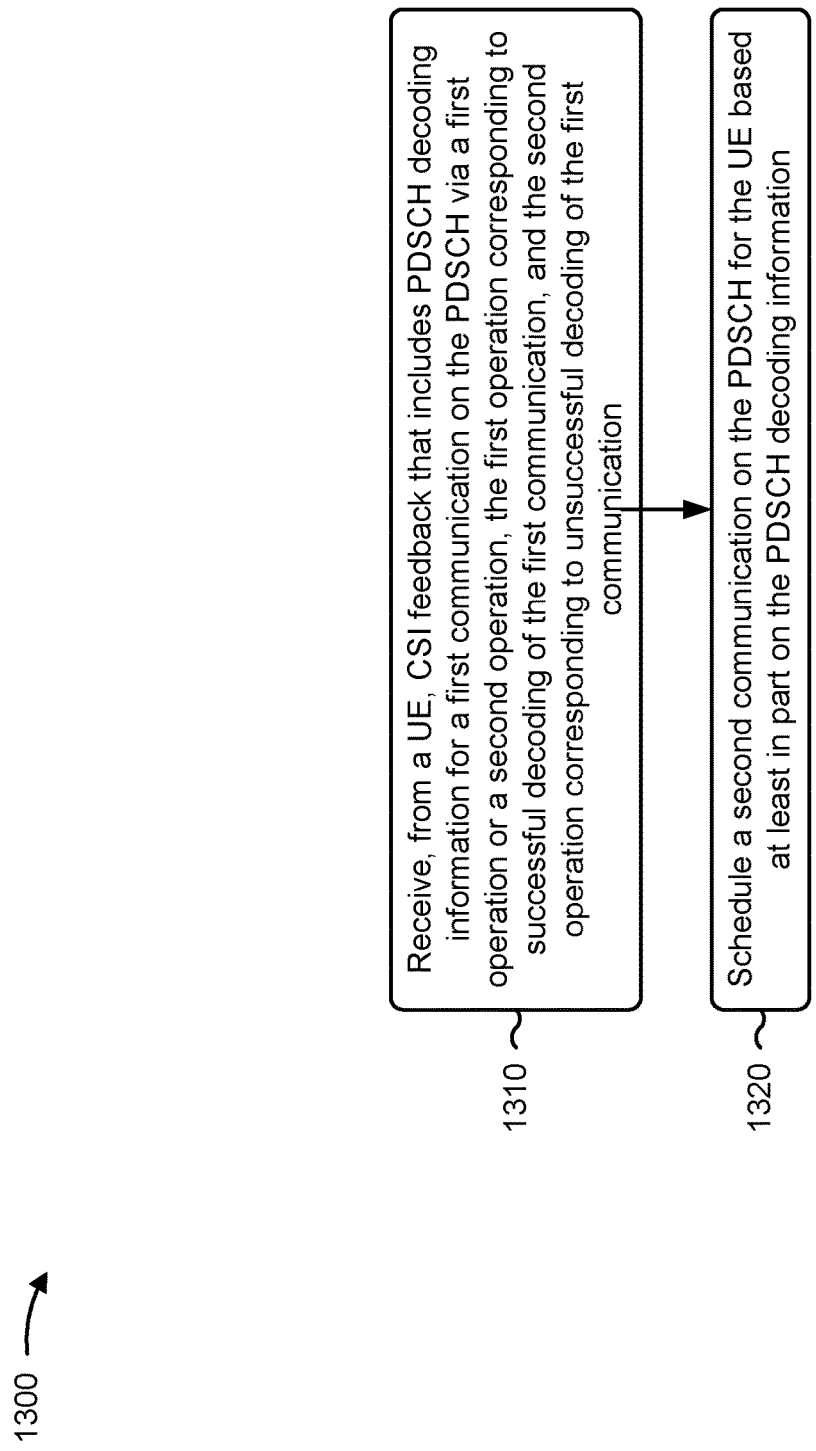
FIG. 13 is a diagram illustrating an example process performed, for example, by a base station, in accordance with the present disclosure.

FIG. 13 is a diagram illustrating an example process 1300 performed, for example, by a base station, in accordance with the present disclosure. Example process 1300 is an example where the base station (e.g., base station 110 depicted in FIGS. 1-3, BS 610 depicted in FIG. 6) performs operations associated with differentiated CSI feedback based on decoding statistics.

As shown in FIG. 13, in some aspects, process 1300 may include receiving, from a UE, CSI feedback that includes PDSCH decoding information for a first communication on the PDSCH via a first operation or a second operation, the first operation corresponding to successful decoding of the first communication on the PDSCH, and the second operation corresponding to unsuccessful decoding of the first communication on the PDSCH (block 1310). For example, the base station (e.g., using reception component 1502 depicted in FIG. 15) may receive, from a UE, CSI feedback that includes PDSCH decoding information for a first communication on the PDSCH via a first operation or a second operation, the first operation corresponding to successful decoding of the first communication on the PDSCH, and the second operation corresponding to unsuccessful decoding of the first communication on the PDSCH, as described above.

As further shown in FIG. 13, in some aspects, process 1300 may include scheduling a second communication on the PDSCH for the UE based at least in part on the PDSCH decoding information (block 1320). For example, the base station (e.g., using scheduling component 1508 depicted in FIG. 15) may schedule a second communication on the PDSCH for the UE based at least in part on the PDSCH decoding information, as described above.

Process 1300 may include additional aspects, such as any single aspect or any combination of aspects described below and/or in connection with one or more other processes described elsewhere herein.

In a first aspect, a time duration between transmission of the second communication and reception of the CSI feedback for the second operation is shorter than a time duration between transmission of the second communication and reception of the CSI feedback for the first operation. In some aspects, a time duration between transmission of the communication and reception of the CSI feedback is shorter for the second operation than for the first operation. In some aspects, if the CSI feedback that includes the PDSCH decoding information is received via the first operation, then a first time duration exists between transmission of the communication and reception of the CSI feedback. If the CSI feedback that includes the PDSCH decoding information is received via the second operation, then a second time duration exists between transmission of the communication and reception of the CSI feedback. The second time duration may be shorter than the first time duration.

In some aspects, a physical uplink resource for the CSI feedback for the first operation is different than a physical uplink resource for the CSI feedback for the second operation. In a second aspect, alone or in combination with the first aspect, a physical uplink resource for the CSI feedback for the first operation occurs after a physical uplink resource for the CSI feedback for the second operation. In some aspects, a first physical uplink resource is used if the CSI feedback is received via the first operation and a second physical uplink resource is used if the CSI feedback is received via the second operation. The first physical uplink resource occurs after the second physical uplink resource.

In a third aspect, alone or in combination with one or more of the first and second aspects, the physical uplink resource for the first operation is a HARQ feedback PUCCH resource that occurs after a HARQ feedback PUCCH resource for the second operation, or a PUSCH resource that occurs after the HARQ feedback PUCCH resource for the second operation. That is, a first physical uplink resource is used if the CSI feedback is received via the first operation and a second physical uplink resource is used if the CSI feedback is received via the second operation, and the first physical uplink resource occurs after the second physical uplink resource. In some aspects, the first physical uplink resource is a HARQ feedback PUCCH resource or a PUSCH resource, and the second physical uplink resource is a HARQ feedback PUCCH resource.

In a fourth aspect, alone or in combination with one or more of the first through third aspects, a delay between the second communication and the HARQ feedback PUCCH resource for the second operation is indicated by a field in DCI scheduling the second communication or based at least in part on a K1 duration.

In a fifth aspect, alone or in combination with one or more of the first through fourth aspects, the physical uplink resource for the second operation is a HARQ feedback PUCCH resource, and the physical uplink resource for the first operation is a physical uplink resource, occurs after the physical uplink resource for the second operation, that includes PDSCH decoding information in the CSI feedback for a plurality of communications on the PDSCH that have been successfully decoded. That is, in some aspects, the first physical uplink resource includes PDSCH decoding information for a plurality of communications on the PDSCH that have been successfully decoded, and the second physical uplink resource is a HARQ feedback PUCCH resource. The first physical uplink resource occurs after the second physical uplink resource.

In a sixth aspect, alone or in combination with one or more of the first through fifth aspects, the CSI feedback for the first operation includes PDSCH decoding information for a plurality of communications on the PDSCH that have been successfully decoded, wherein the plurality of communications includes the communication.

In a seventh aspect, alone or in combination with one or more of the first through sixth aspects, the CSI feedback for the first operation includes a respective PDSCH decoding information report for each respective communication of the plurality of communications.

In an eighth aspect, alone or in combination with one or more of the first through seventh aspects, the CSI feedback for the first operation includes a single PDSCH decoding information report for the plurality of communications.

In a ninth aspect, alone or in combination with one or more of the first through eighth aspects, receiving the CSI feedback for the plurality of communications via the first operation includes receiving the CSI feedback in a periodic PUCCH resource.

In a tenth aspect, alone or in combination with one or more of the first through ninth aspects, process 1300 includes transmitting an uplink grant in a physical downlink resource that schedules a PUSCH resource for receiving decoding information in the CSI feedback for a plurality of successfully decoded communications on the PDSCH, where receiving the CSI feedback for the plurality of communications via the first operation includes receiving the CSI feedback in the scheduled PUSCH resource.

In an eleventh aspect, alone or in combination with one or more of the first through tenth aspects, the uplink grant is dedicated for PDSCH decoding information included in the CSI feedback.

In a twelfth aspect, alone or in combination with one or more of the first through eleventh aspects, the uplink grant indicates a quantity of PDSCH decoding reports for successfully decoded communications on the PDSCH that are able to be aggregated in the PUSCH resource that is scheduled by the uplink grant.

In a thirteenth aspect, alone or in combination with one or more of the first through twelfth aspects, the PDSCH decoding information in the CSI feedback includes one or more of a bit error rate, a decoding LLR, an SNR, a CQI that represents PDSCH decoding statistics, a PMI that represents PDSCH decoding statistics, or an RSRP.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
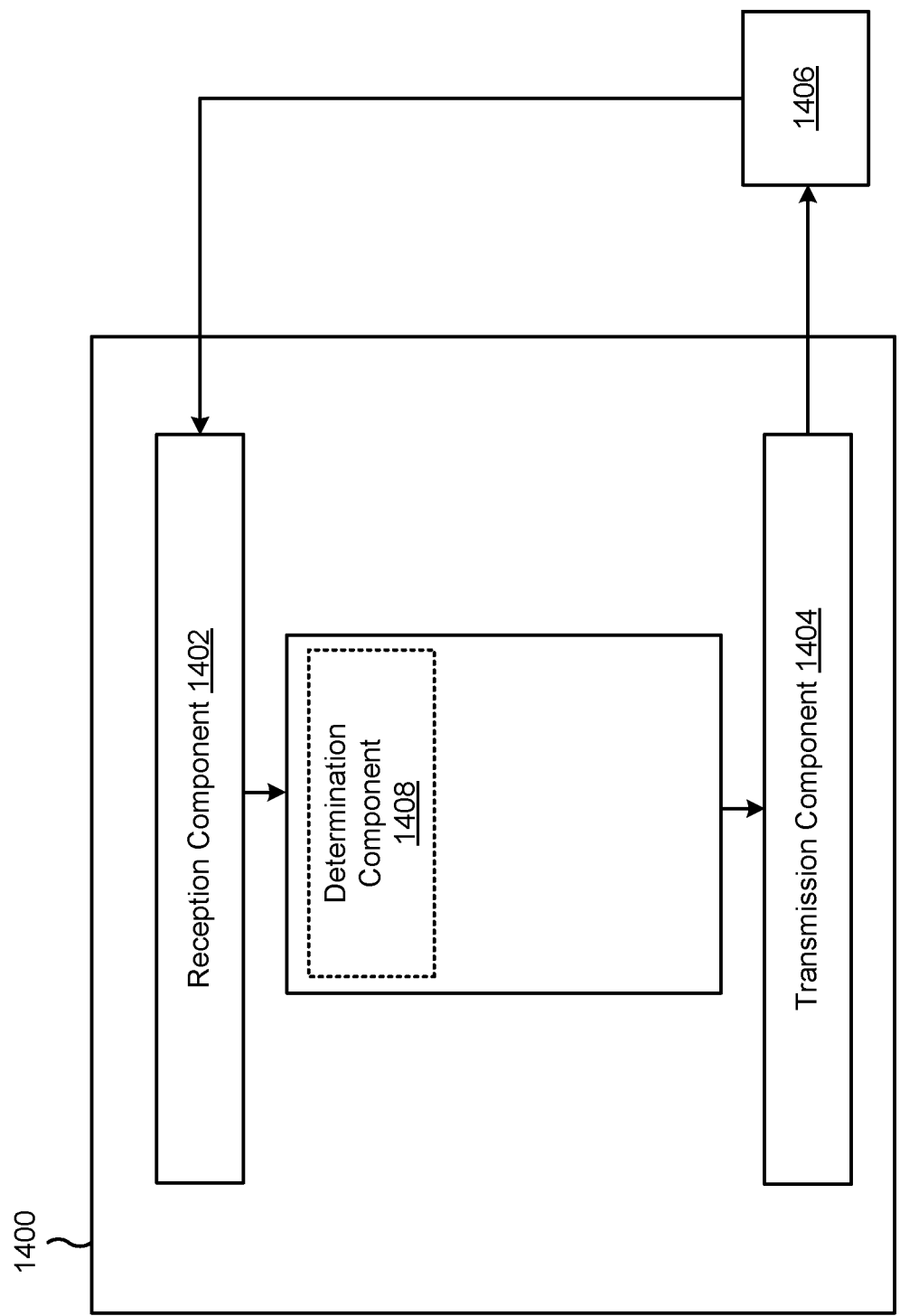
FIGS. 14-15 are block diagrams of example apparatuses for wireless communication, in accordance with the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 1-11. Additionally, or alternatively, the apparatus 1400 may be configured to perform one or more processes described herein, such as process 12 of FIG. 12. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The determination component 1408 may determine that a communication on a PDSCH was successfully decoded or was not successfully decoded. In some aspects, the determination component 1408 may include a demodulator, a MIMO detector, a receive processor, a controller/processor, a memory, or a combination thereof, of the UE described above in connection with FIG. 2. The transmission component 1404 may transmit CSI feedback that includes PDSCH decoding information via a first operation based at least in part on the determination that the communication was successfully decoded, or via a second operation based at least in part on the determination that the communication was not successfully decoded.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
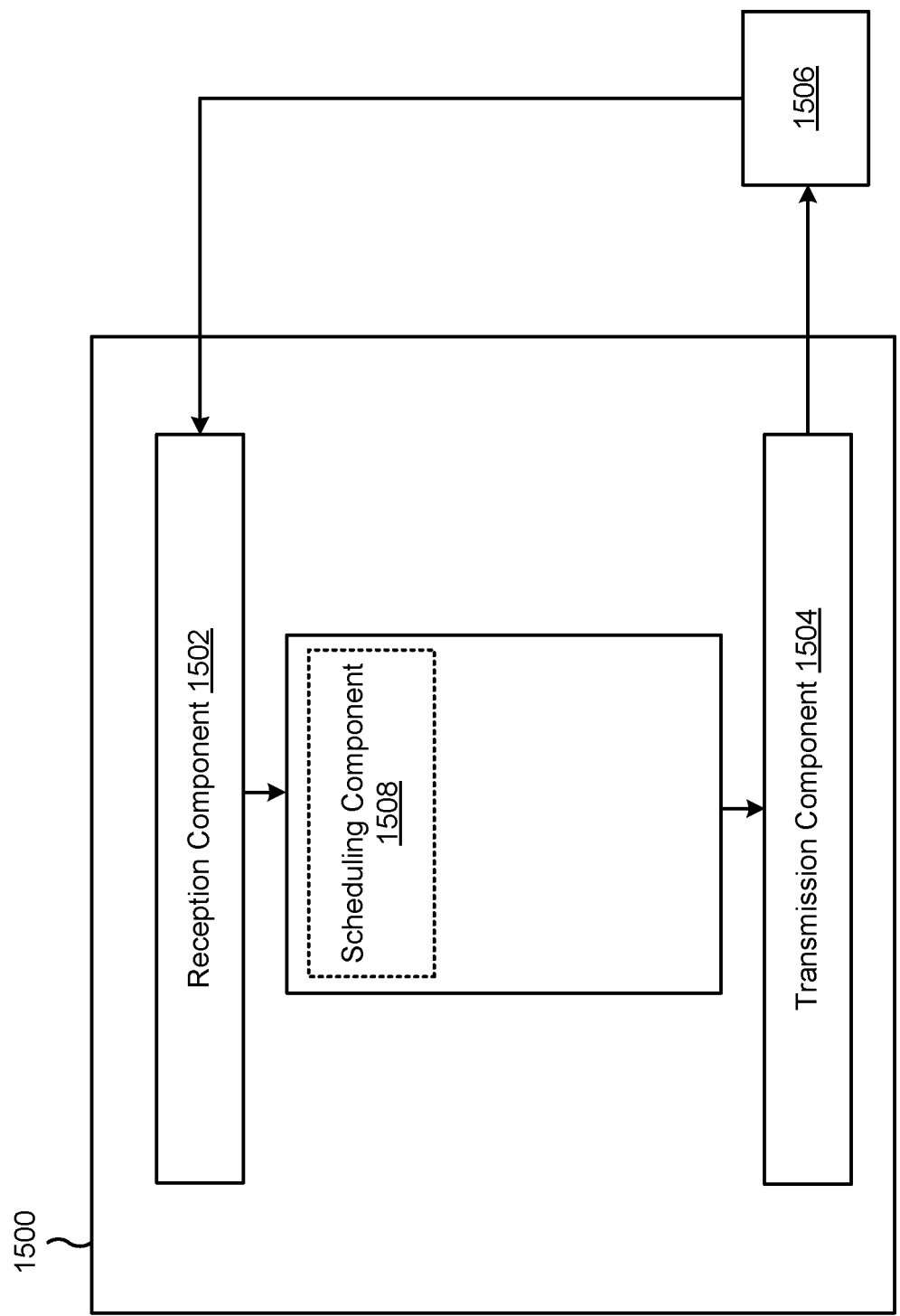

FIG. 15 is a block diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a scheduling component 1508, among other examples.

In some aspects, the apparatus 1500 may be configured to perform one or more operations described herein in connection with FIGS. 1-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be co-located with the reception component 1502 in a transceiver.

The reception component 1502 may receive, from a UE, CSI feedback that includes PDSCH decoding information for a first communication on the PDSCH via a first operation or a second operation, the first operation corresponding to successful decoding of the first communication on the PDSCH, and the second operation corresponding to unsuccessful decoding of the first communication on the PDSCH. The scheduling component 1508 may schedule a second communication on the PDSCH for the UE based at least in part on the PDSCH decoding information. In some aspects, the scheduling component 1508 may include a demodulator, a MIMO detector, a receive processor, a modulator, a transmit MIMO processor, a transmit processor, a controller/processor, a memory, or a combination thereof, of the base station described above in connection with FIG. 2.

The transmission component 1504 may transmit an uplink grant in a physical downlink resource that schedules a PUSCH resource for receiving decoding information in the CSI feedback for a plurality of successfully decoded communications on the PDSCH, where receiving the CSI feedback for the plurality of communications via the first operation includes receiving the CSI feedback in the scheduled PUSCH resource.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: determining that a communication on a physical downlink shared channel (PDSCH) was successfully decoded or was not successfully decoded; and transmitting channel state information (CSI) feedback that includes PDSCH decoding information via a first operation based at least in part on the determination that the communication was successfully decoded, or via a second operation based at least in part on the determination that the communication was not successfully decoded.

Aspect 2: The method of Aspect 1, wherein a time duration between reception of the communication and transmission of the CSI feedback is shorter for the second operation than for the first operation.

Aspect 3: The method of Aspect 1 or 2, wherein a first physical uplink resource for the CSI feedback for the first operation is different than a second physical uplink resource for the CSI feedback for the second operation.

Aspect 4: The method of any of Aspects 1-3, wherein a first physical uplink resource is used if the CSI feedback is transmitted via the first operation and a second physical uplink resource is used if the CSI feedback is transmitted via the second operation, and wherein the first physical uplink resource occurs after the second physical uplink resource.

Aspect 5: The method of Aspect 4, wherein the first physical uplink resource is a hybrid automatic repeat request (HARQ) feedback physical uplink control channel (PUCCH) resource or a physical uplink shared channel (PUSCH) resource, and wherein the second physical uplink resource is a HARQ feedback PUCCH resource.

Aspect 6: The method of Aspect 5, wherein a delay between the communication and the HARQ feedback PUCCH resource for the second operation is indicated by a field in downlink control information scheduling the communication.

Aspect 7: The method of Aspect 4, wherein the first physical uplink resource includes PDSCH decoding information for a plurality of communications on the PDSCH that have been successfully decoded, wherein the second physical uplink resource includes a hybrid automatic repeat request (HARD) feedback physical uplink control channel (PUCCH) resource.

Aspect 8: The method of any of Aspects 1-7, wherein the CSI feedback for the first operation includes PDSCH decoding information for a plurality of communications on the PDSCH that have been successfully decoded, and wherein the plurality of communications includes the communication.

Aspect 9: The method of Aspect 8, wherein the CSI feedback for the first operation includes a respective PDSCH decoding information report for each respective communication of the plurality of communications.

Aspect 10: The method of Aspect 8, wherein the CSI feedback for the first operation includes a single PDSCH decoding information report for the plurality of communications.

Aspect 11: The method of Aspect 8, wherein transmitting the CSI feedback for the plurality of communications via the first operation includes transmitting the CSI feedback in a periodic physical uplink control channel (PUCCH) resource.

Aspect 12: The method of Aspect 8, wherein transmitting the CSI feedback for the plurality of communications via the first operation includes transmitting the CSI feedback in a physical uplink shared channel (PUSCH) resource that is scheduled by an uplink grant in a physical downlink resource.

Aspect 13: The method of Aspect 12, wherein the uplink grant is dedicated for PDSCH decoding information included in the CSI feedback.

Aspect 14: The method of Aspect 12, wherein the uplink grant indicates a quantity of PDSCH decoding reports for successfully decoded communications on the PDSCH that are to be aggregated in the PUSCH resource that is scheduled by the uplink grant.

Aspect 15: The method of any of Aspects 1-14, wherein the PDSCH decoding information includes one or more of a bit error rate, a decoding logarithm of likelihood ratio, a signal to noise ratio, a channel quality indicator that represents PDSCH decoding statistics, a precoding matrix indicator that represents PDSCH decoding statistics, or a reference signal received power.

Aspect 16: A method of wireless communication performed by a base station, comprising: receiving, from a user equipment (UE), channel state information (CSI) feedback that includes physical downlink shared channel (PDSCH) decoding information for a first communication on the PDSCH via a first operation or a second operation, the first operation corresponding to successful decoding of the first communication on the PDSCH, and the second operation corresponding to unsuccessful decoding of the first communication on the PDSCH; and scheduling a second communication on the PDSCH for the UE based at least in part on the PDSCH decoding information.

Aspect 17: The method of Aspect 16, wherein a time duration between transmission of the communication and reception of the CSI feedback is shorter for the second operation than for the first operation.

Aspect 18: The method of Aspect 16 or 17, wherein a first physical uplink resource for the CSI feedback for the first operation is different than a second physical uplink resource for the CSI feedback for the second operation.

Aspect 19: The method of any of Aspects 16-18, wherein a first physical uplink resource is used if the CSI feedback is received via the first operation and a second physical uplink resource is used if the CSI feedback is received via the second operation, and wherein the first physical uplink resource occurs after the second physical uplink resource.

Aspect 20: The method of Aspect 19, wherein the first physical uplink resource is a hybrid automatic repeat request (HARQ) feedback physical uplink control channel (PUCCH) resource or a physical uplink shared channel (PUSCH) resource, and wherein the second physical uplink resource is a HARQ feedback PUCCH resource.

Aspect 21: The method of Aspect 20, wherein a delay between the second communication and the HARQ feedback PUCCH resource for the second operation is indicated by a field in downlink control information scheduling the second communication.

Aspect 22: The method of Aspect 19, wherein the first physical uplink resource includes PDSCH decoding information for a plurality of communications on the PDSCH that have been successfully decoded, wherein the second physical uplink resource includes a hybrid automatic repeat request (HARQ) feedback physical uplink control channel (PUCCH) resource, and wherein the first physical uplink resource occurs after the second physical uplink resource.

Aspect 23: The method of any of Aspects 16-22, wherein the CSI feedback for the first operation includes PDSCH decoding information for a plurality of communications on the PDSCH that have been successfully decoded, wherein the plurality of communications includes the communication.

Aspect 24: The method of Aspect 23, wherein the CSI feedback for the first operation includes a respective PDSCH decoding information report for each respective communication of the plurality of communications.

Aspect 25: The method of Aspect 23, wherein the CSI feedback for the first operation includes a single PDSCH decoding information report for the plurality of communications.

Aspect 26: The method of any of Aspects 23-25, wherein receiving the CSI feedback for the plurality of communications via the first operation includes receiving the CSI feedback in a periodic physical uplink control channel (PUCCH) resource.

Aspect 27: The method of any of Aspects 23-26, further comprising transmitting an uplink grant in a physical downlink resource that schedules a physical uplink shared channel (PUSCH) resource for receiving decoding information in the CSI feedback for a plurality of successfully decoded communications on the PDSCH, wherein receiving the CSI feedback for the plurality of communications via the first operation includes receiving the CSI feedback in the scheduled PUSCH resource.

Aspect 28: The method of Aspect 27, wherein the uplink grant is dedicated for PDSCH decoding information included in the CSI feedback.

Aspect 29: The method of Aspect 27 or 28, wherein the uplink grant indicates a quantity of PDSCH decoding reports for successfully decoded communications on the PDSCH that are able to be aggregated in the PUSCH resource that is scheduled by the uplink grant.

Aspect 30: The method of any of Aspects 16-29, wherein the PDSCH decoding information includes one or more of a bit error rate, a decoding logarithm of likelihood ratio, a signal to noise ratio, a channel quality indicator that represents PDSCH decoding statistics, a precoding matrix indicator that represents PDSCH decoding statistics, or a reference signal received power.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, wherein the one or more processors are configured to:
      determine that a communication on a physical downlink shared channel (PDSCH) was successfully decoded or was not successfully decoded; and
      transmit channel state information (CSI) feedback that includes PDSCH decoding information via a first operation based at least in part on the determination that the communication was successfully decoded, or via a second operation based at least in part on the determination that the communication was not successfully decoded,
      wherein a time duration between reception of the communication and transmission of the CSI feedback is shorter for the second operation than for the first operation.

2. The UE of claim 1, wherein a first physical uplink resource for the CSI feedback for the first operation is different than a second physical uplink resource for the CSI feedback for the second operation.

3. The UE of claim 1, wherein a first physical uplink resource is used if the CSI feedback is transmitted via the first operation and a second physical uplink resource is used if the CSI feedback is transmitted via the second operation, and wherein the first physical uplink resource occurs after the second physical uplink resource.

4. The UE of claim 3, wherein the first physical uplink resource is a hybrid automatic repeat request (HARQ) feedback physical uplink control channel (PUCCH) resource or a physical uplink shared channel (PUSCH) resource, and wherein the second physical uplink resource is a HARQ feedback PUCCH resource.

5. The UE of claim 4, wherein a delay between the communication and the HARQ feedback PUCCH resource for the second operation is indicated by a field in downlink control information scheduling the communication.

6. The UE of claim 3, wherein the first physical uplink resource includes PDSCH decoding information for a plurality of communications on the PDSCH that have been successfully decoded, wherein the second physical uplink resource is a hybrid automatic repeat request (HARQ) feedback physical uplink control channel (PUCCH) resource.

7. The UE of claim 1, wherein the CSI feedback for the first operation includes PDSCH decoding information for a plurality of communications on the PDSCH that have been successfully decoded, and wherein the plurality of communications includes the communication.

8. The UE of claim 7, wherein the CSI feedback for the first operation includes a respective PDSCH decoding information report for each respective communication of the plurality of communications.

9. The UE of claim 7, wherein the CSI feedback for the first operation includes a single PDSCH decoding information report for the plurality of communications.

10. The UE of claim 7, wherein the one or more processors, to transmit the CSI feedback for the plurality of communications via the first operation, are configured to:
transmit the CSI feedback in a periodic physical uplink control channel (PUCCH) resource.

11. The UE of claim 7, wherein the one or more processors, to transmit the CSI feedback for the plurality of communications via the first operation, are configured to:
transmit the CSI feedback in a physical uplink shared channel (PUSCH) resource that is scheduled by an uplink grant in a physical downlink resource.

12. The UE of claim 11, wherein the uplink grant is dedicated for PDSCH decoding information included in the CSI feedback.

13. The UE of claim 11, wherein the uplink grant indicates a quantity of PDSCH decoding reports for successfully decoded communications on the PDSCH that are to be aggregated in the PUSCH resource that is scheduled by the uplink grant.

14. The UE of claim 1, wherein the PDSCH decoding information includes one or more of a bit error rate, a decoding logarithm of likelihood ratio, a signal to noise ratio, a channel quality indicator that represents PDSCH decoding statistics, a precoding matrix indicator that represents the PDSCH decoding statistics, or a reference signal received power.

15. A network entity for wireless communication, comprising:
a memory; and
one or more processors coupled to the memory, wherein the one or more processors are configured to:
receive, from a user equipment (UE), channel state information (CSI) feedback that includes physical downlink shared channel (PDSCH) decoding information for a first communication on the PDSCH via a first operation or a second operation, the first operation corresponding to successful decoding of the first communication on the PDSCH, and the second operation corresponding to unsuccessful decoding of the first communication on the PDSCH, wherein a time duration between transmission of the first communication and reception of the CSI feedback is shorter for the second operation than for the first operation; and
schedule a second communication on the PDSCH for the UE based at least in part on the PDSCH decoding information.

16. The network entity of claim 15, wherein a first physical uplink resource for the CSI feedback for the first operation is different than a second physical uplink resource for the CSI feedback for the second operation.

17. The network entity of claim 15, wherein a first physical uplink resource is used if the CSI feedback is received via the first operation and a second physical uplink resource is used if the CSI feedback is received via the second operation, and wherein the first physical uplink resource occurs after the second physical uplink resource.

18. The network entity of claim 17, wherein the first physical uplink resource is a hybrid automatic repeat request (HARQ) feedback physical uplink control channel (PUCCH) resource or a physical uplink shared channel (PUSCH) resource, and wherein the second physical uplink resource is a HARQ feedback PUCCH resource.

19. The network entity of claim 18, wherein a delay between the second communication and the HARQ feedback PUCCH resource for the second operation is indicated by a field in downlink control information scheduling the second communication.

20. The network entity of claim 17, wherein the first physical uplink resource includes PDSCH decoding information for a plurality of communications on the PDSCH that have been successfully decoded, wherein the second physical uplink resource is a hybrid automatic repeat request (HARQ) feedback physical uplink control channel (PUCCH) resource, and wherein the first physical uplink resource occurs after the second physical uplink resource.

21. The network entity of claim 15, wherein the CSI feedback for the first operation includes one or more of PDSCH decoding information for a plurality of communications on the PDSCH that have been successfully decoded, a respective PDSCH decoding information report for each respective communication of the plurality of communications, or a single PDSCH decoding information report for the plurality of communications, and wherein the plurality of communications includes the first communication.

22. The network entity of claim 21, wherein the one or more processors, to receive the CSI feedback for the plurality of communications via the first operation, are configured to:
receive the CSI feedback in a periodic physical uplink control channel (PUCCH) resource.

23. The network entity of claim 21, wherein:
the one or more processors are configured to transmit an uplink grant in a physical downlink resource that schedules a physical uplink shared channel (PUSCH) resource for receiving decoding information in the CSI feedback for a plurality of successfully decoded communications on the PDSCH; and
the one or more processors, to receive the CSI feedback for the plurality of communications via the first operation, are configured to:
receive the CSI feedback in the scheduled PUSCH resource.

24. The network entity of claim 23, wherein the uplink grant is dedicated for PDSCH decoding information included in CSI feedback.

25. The network entity of claim 23, wherein the uplink grant indicates a quantity of PDSCH decoding reports for successfully decoded communications on the PDSCH that are able to be aggregated in the PUSCH resource that is scheduled by the uplink grant.

26. The network entity of claim 15, wherein the PDSCH decoding information includes one or more of a bit error rate, a decoding logarithm of likelihood ratio, a signal to noise ratio, a channel quality indicator that represents PDSCH decoding statistics, a precoding matrix indicator that represents the PDSCH decoding statistics, or a reference signal received power.

27. A method of wireless communication performed by a user equipment (UE), comprising:
determining that a communication on a physical downlink shared channel (PDSCH) was successfully decoded or was not successfully decoded; and
transmitting channel state information (C SI) feedback that includes PDSCH decoding information via a first operation based at least in part on the determination that the communication was successfully decoded, or via a second operation based at least in part on the determination that the communication was not successfully decoded, wherein a time duration between reception of the communication and transmission of the CSI feedback is shorter for the second operation than for the first operation.

28. A method of wireless communication performed by a network entity, comprising:

receiving, from a user equipment (UE), channel state information (CSI) feedback that includes physical downlink shared channel (PDSCH) decoding information for a first communication on the PDSCH via a first operation or a second operation, the first operation corresponding to successful decoding of the first communication on the PDSCH, and the second operation corresponding to unsuccessful decoding of the first communication on the PDSCH, wherein a time duration between transmission of the first communication and reception of the CSI feedback is shorter for the second operation than for the first operation; and scheduling a second communication on the PDSCH for the UE based at least in part on the PDSCH decoding information.

29. The method of claim 27, wherein a first physical uplink resource for the CSI feedback for the first operation is different than a second physical uplink resource for the CSI feedback for the second operation.

30. The method of claim 28, wherein a first physical uplink resource for the CSI feedback for the first operation is different than a second physical uplink resource for the CSI feedback for the second operation.

* * * * *